US012364636B2

(12) United States Patent
Heneveld, Jr. et al.

(10) Patent No.: US 12,364,636 B2
(45) Date of Patent: Jul. 22, 2025

(54) PATIENT SUPPORT APPARATUS WITH LIFT MECHANISM

(71) Applicant: Stryker Corporation, Kalamazoo, MI (US)

(72) Inventors: William Ross Heneveld, Jr., Portage, MI (US); Chad Conway Souke, Vicksburg, MI (US); Michael T. Brubaker, Portage, MI (US); Mackenzie Van Loon, Mattawan, MI (US)

(73) Assignee: Stryker Corporation, Portage, MI (US)

( * ) Notice: Subject to any disclaimer, the term of this patent is extended or adjusted under 35 U.S.C. 154(b) by 0 days.

(21) Appl. No.: 18/602,113

(22) Filed: Mar. 12, 2024

(65) Prior Publication Data

US 2024/0216199 A1 Jul. 4, 2024

Related U.S. Application Data

(63) Continuation of application No. 17/847,433, filed on Jun. 23, 2022, now Pat. No. 11,951,055, which is a continuation of application No. 17/132,016, filed on Dec. 23, 2020, now Pat. No. 11,400,003.

(60) Provisional application No. 62/954,862, filed on Dec. 30, 2019.

(51) Int. Cl.

| | |
|---|---|
| ***A61G 7/10*** | (2006.01) |
| ***A61G 1/02*** | (2006.01) |
| ***A61G 1/056*** | (2006.01) |

(52) U.S. Cl.

CPC ......... *A61G 7/1034* (2013.01); *A61G 1/0262* (2013.01); *A61G 1/0567* (2013.01); *A61G 7/1001* (2013.01); *A61G 7/1055* (2013.01); *A61G 7/1057* (2013.01)

(58) Field of Classification Search

None

See application file for complete search history.

(56) References Cited

U.S. PATENT DOCUMENTS

| | | | |
|---|---|---|---|
| 4,267,610 | A | 5/1981 | Blakeway et al. |
| 7,389,552 | B1 | 6/2008 | Reed et al. |
| 7,398,571 | B2 | 7/2008 | Souke et al. |
| 8,051,513 | B2 | 11/2011 | Reed et al. |
| 8,152,378 | B2 | 4/2012 | Tsai |
| 8,155,918 | B2 | 4/2012 | Reed et al. |
| 10,369,063 | B2 | 8/2019 | Matheny et al. |
| 11,400,003 | B2 | 8/2022 | Heneveld, Jr. et al. |
| 2009/0222988 | A1 | 9/2009 | Reed et al. |

(Continued)

*Primary Examiner* — Adam C Ortiz

(74) *Attorney, Agent, or Firm* — Howard & Howard Attorneys PLLC

(57) ABSTRACT

A patient support apparatus supports a patient and includes a litter. A base is disposed below the litter. A lift mechanism is configured to move the litter and the base relative to one another between extended and collapsed positions. The lift mechanism includes first and second frame assemblies each including an outer frame member and an inner frame member arranged to move within the outer frame member. First and second rollers and first and second slide members are disposed between the outer and inner frame members. The first and second rollers are arranged to roll along at least one of the outer and inner frame members with a load exerted on the lift mechanism from the litter. The first and second slide members are arranged to slide along at least one of the outer and inner frame members with a load exerted on the lift mechanism from the base.

20 Claims, 15 Drawing Sheets

(56) References Cited

U.S. PATENT DOCUMENTS

| | | | |
|---|---|---|---|
| 2011/0080016 | A1 | 4/2011 | Lambarth et al. |
| 2018/0303689 | A1 | 10/2018 | Souke et al. |
| 2021/0196545 | A1 | 7/2021 | Heneveld, Jr. et al. |
| 2022/0323282 | A1 | 10/2022 | Heneveld, Jr. et al. |

FIG. 8
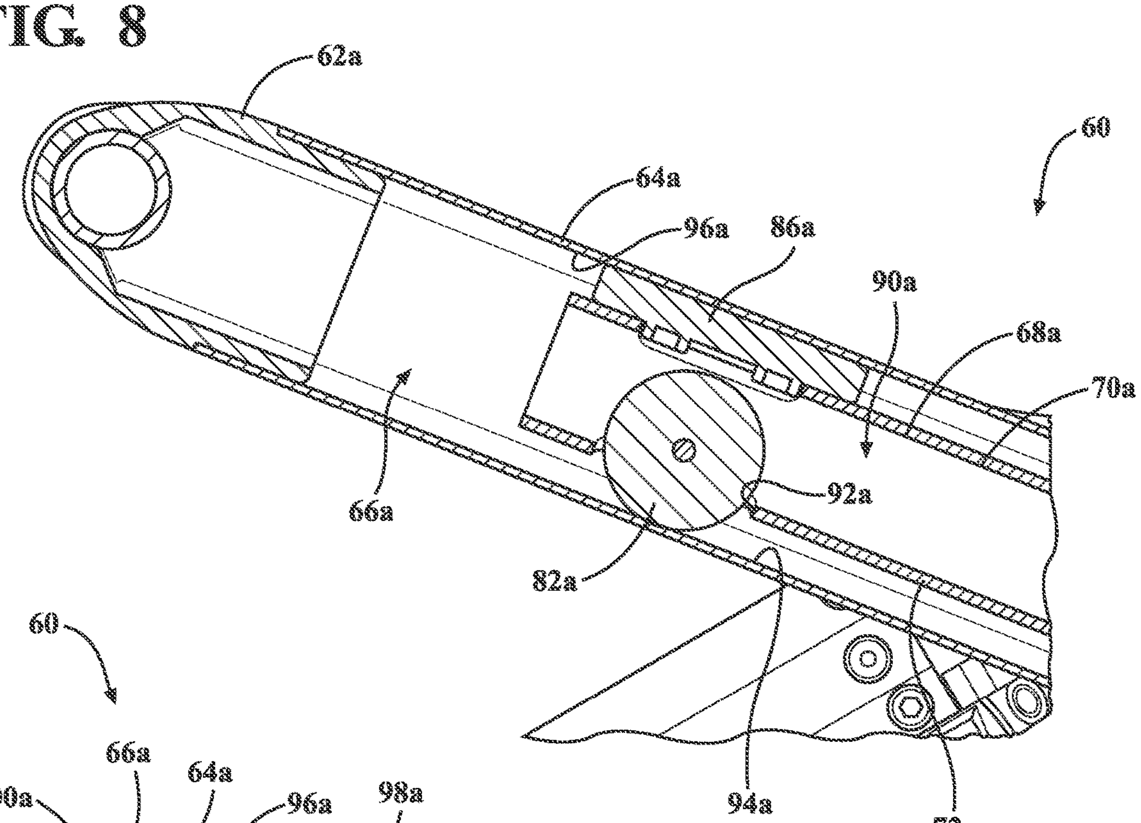
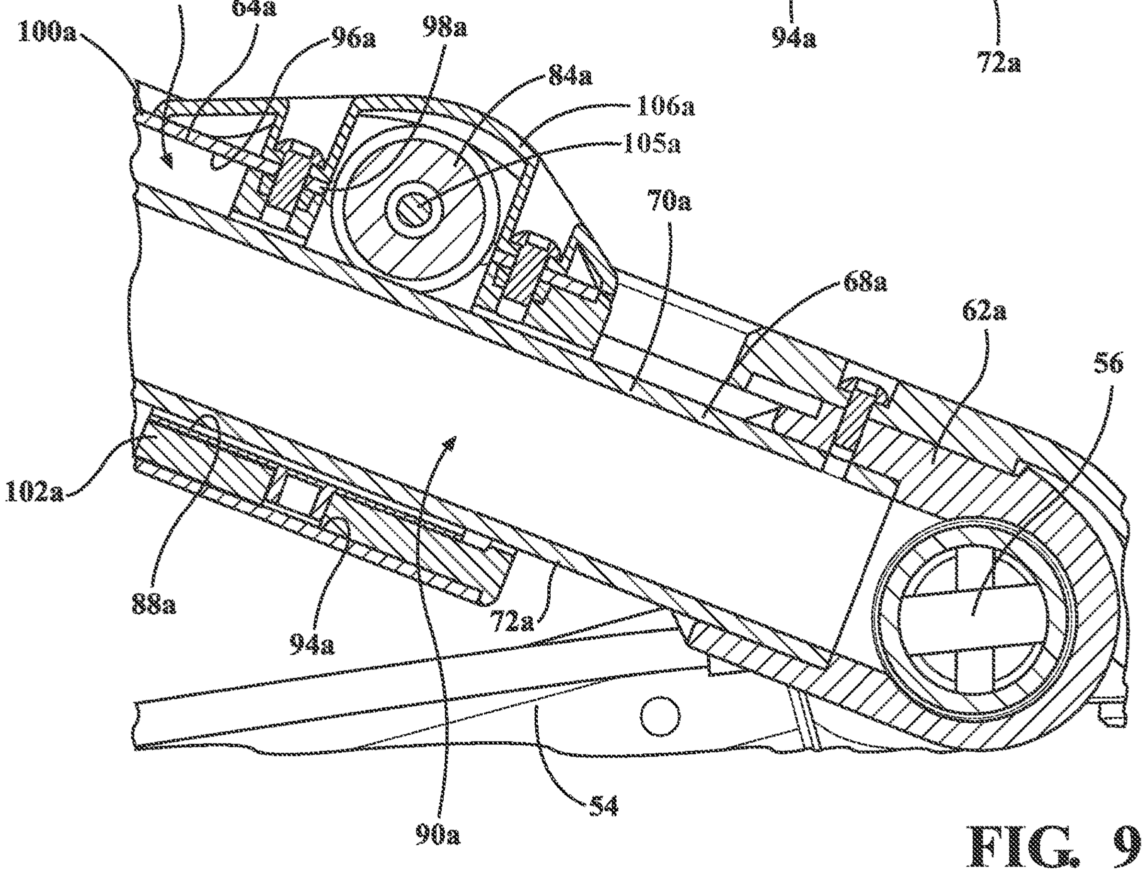
FIG. 9

FIG. 14
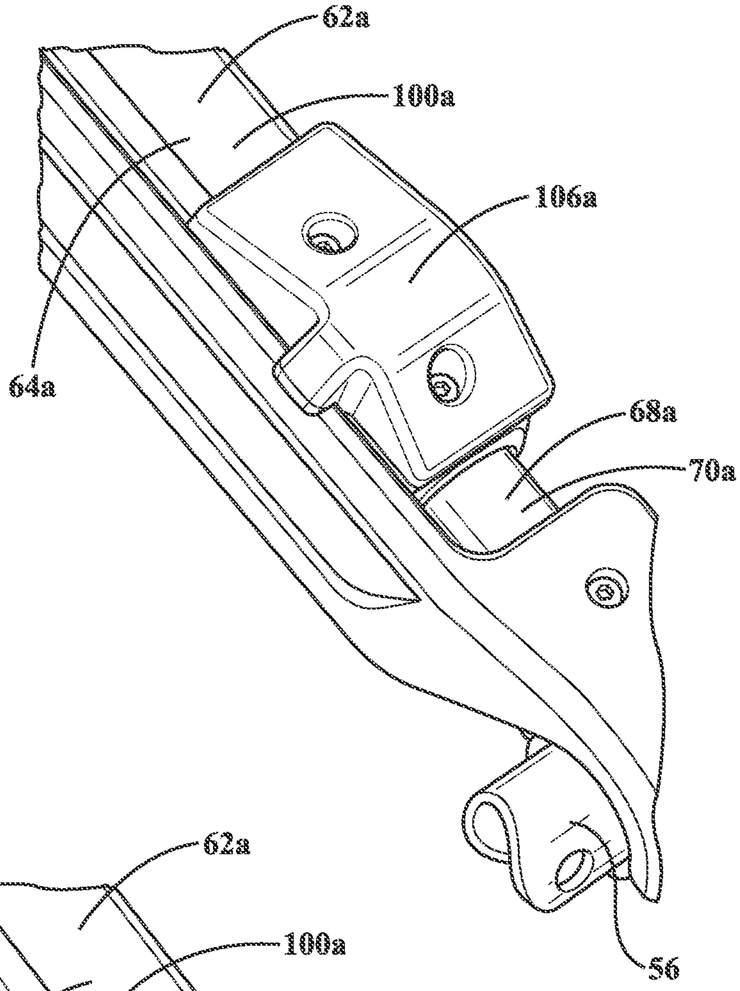
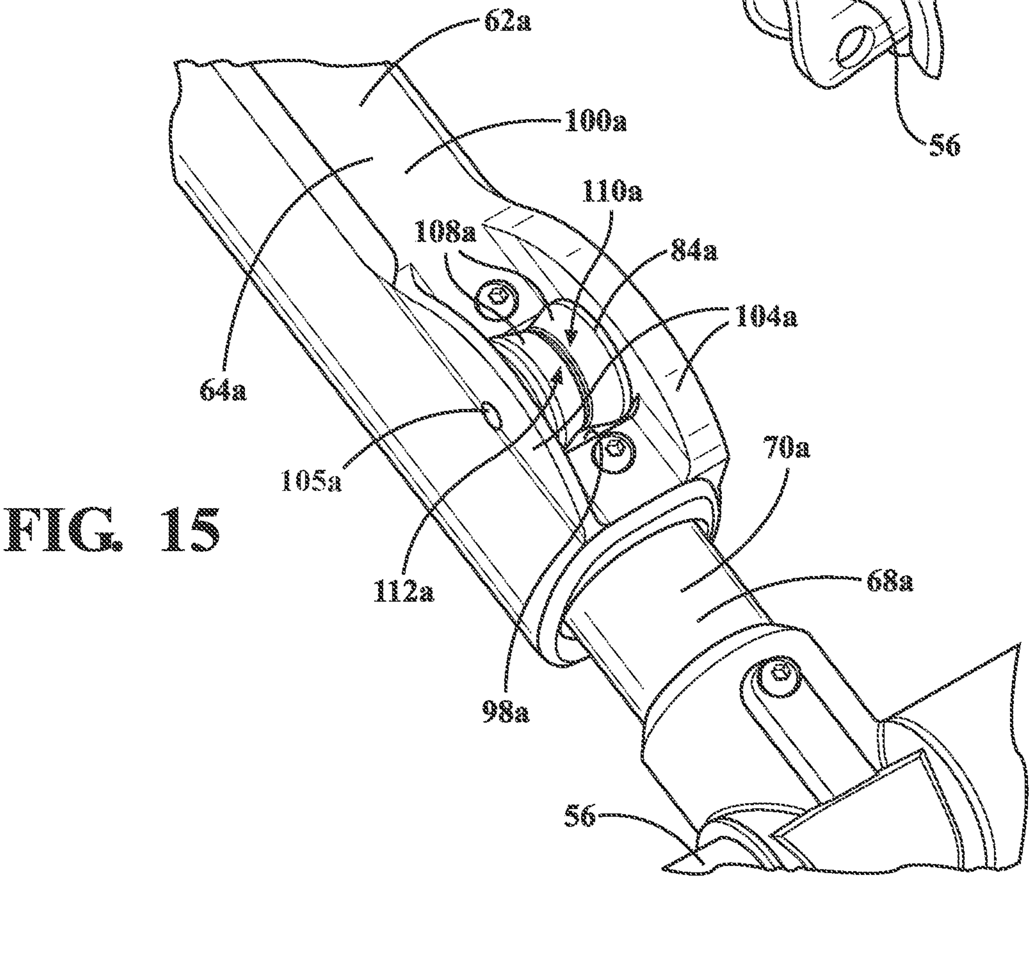
FIG. 15

PATIENT SUPPORT APPARATUS WITH LIFT MECHANISM

RELATED APPLICATIONS

This application is a Continuation of U.S. patent application Ser. No. 17/847,433 filed on Jun. 23, 2022, which is a Continuation of U.S. patent application Ser. No. 17/132,016 filed on Dec. 23, 2020 and issued as U.S. Pat. No. 11,400,003 on Aug. 2, 2022, which claims priority to and the benefit of U.S. Provisional Patent Application No. 62/954,862 filed on Dec. 30, 2019, the disclosures of each of which are hereby incorporated by reference in their entirety.

BACKGROUND

Patient support systems facilitate care of patients in a health care setting. Patient support systems comprise patient support apparatuses such as, for example, hospital beds, stretchers, cots, tables, wheelchairs, and chairs. Many types of conventional patient support apparatuses generally include a base and a litter upon which the patient is supported.

Often, patient support apparatuses have one or more powered devices to perform one or more functions on the patient support apparatus. These functions may include lifting and lowering the litter or the base via a lift mechanism and/or raising a patient from a horizontal position to an inclined position, or vice versa, via one or more actuator mechanisms, and the like. Because the patient support apparatus is generally mobile, electrical connection to a power outlet of the one or more powered devices is not always available, and as such the apparatus typically includes a battery which is coupled to the various powered devices to allow the powering of such devices as the apparatus is moved between locations (e.g., after being unloaded from an emergency vehicle).

For patient support apparatuses which utilize lift mechanisms, powered actuators may be employed to facilitate relative movement between the base and the litter between a plurality of vertical configurations, including for example a retracted configuration or an extended configuration. Here, it will be appreciated that other types of lift mechanisms may be configured without powered actuators, and may rely on caregivers to manually or semi-manually (e.g., with spring-assisted or similar mechanisms) facilitate relative movement between the litter and the base.

Some types of patient support apparatuses employ lift mechanisms with one or more telescoping leg assemblies including a main rail and an inner rail that moves relative to the main rail, such as via linear slides provided to facilitate telescoping movement of the inner rail relative to the main rail. It will be appreciated that linear slides can be subjected to significant loads and wear during use. Here, depending on the specific configuration of the patient support apparatus, linear slides may need to be replaced if excessive wear occurs. Moreover, depending on the environment in which these types of patient support apparatuses are utilized, debris and other contaminants may accumulate during use, which may result in decreased performance and wear of the linear slides, causing decreased performance of the lift mechanisms. Other types of conventional patient support apparatuses may employ an arrangement of wheels to facilitate telescoping movement of the inner rail relative to the main rail, but these types of designs are typically bulky, utilize several wheels for each rail, are generally more complicated to manufacture and assemble, are generally difficult to service, and can still result in decreased performance in response to the accumulation of debris and other contaminants.

A patient support apparatus designed to overcome one or more of the aforementioned challenges is desired.

BRIEF DESCRIPTION OF THE DRAWINGS

FIG. 8 is an enlarged, partial sectional view of the first frame assembly of FIGS. 4-5, shown having outer and inner frame members, a first roller, and a first slide member.

FIG. 9 is another enlarged, partial sectional view of the first frame assembly of FIGS. 4-5, shown having a second roller and a second slide member.

FIG. 14 is an enlarged, partial perspective view of the first frame assembly of FIGS. 4-5, shown having a cover disposed over the second roller.

FIG. 15 is another enlarged, partial perspective view of the first frame assembly of FIG. 14, shown with the cover removed to depict the second roller.

DETAILED DESCRIPTION

Figure 1:
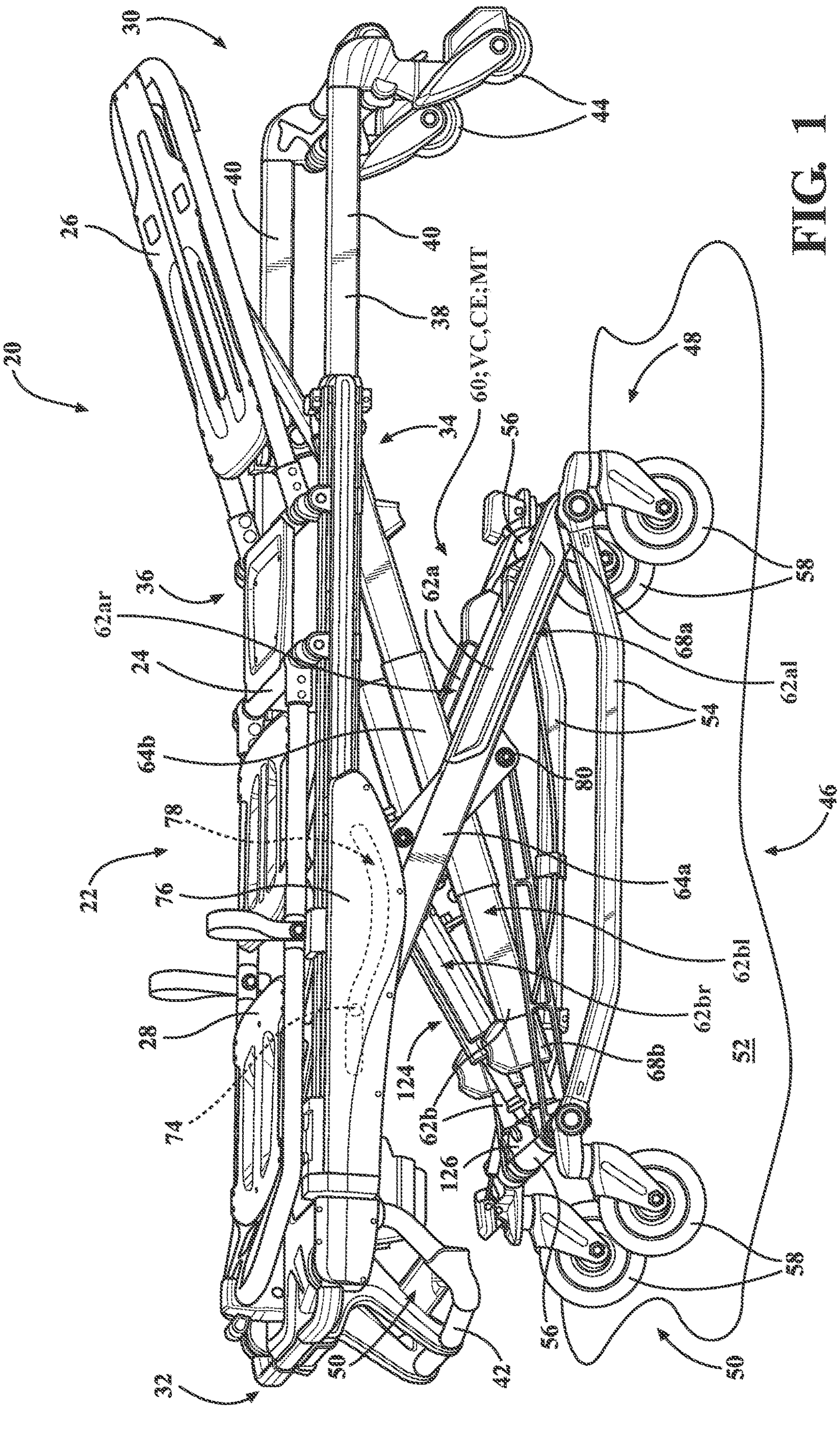
FIG. 1 is a perspective view of a patient support apparatus shown having a base, a lift mechanism, and a litter.

Referring to FIG. 1, a patient support apparatus 20 is shown for supporting a patient in a health care and/or transportation setting. The patient support apparatus 20 illustrated in FIG. 1 is configured as a wheeled cot. In other embodiments, however, the patient support apparatus 20 may be configured as a hospital bed, stretcher, table, wheelchair, chair, or similar apparatus utilized in the transportation and care of a patient.

The patient support apparatus 20 comprises a litter 22 with a patient support deck 24 configured to support the patient. The patient support deck 24 may be defined by one or more articulable deck sections, for example, a back section 26 and a foot section 28 (as well as a seat section, a leg section, or any other suitable arrangement of sections), to facilitate care and/or transportation of the patient in various patient positions. The litter 22 extends generally longitudinally between a first litter end 30 (e.g., adjacent to the patient's head) and a second litter end 32 (e.g., adjacent to the patient's feet). In addition, the litter 22 also extends generally laterally between a first side end 34 (e.g., adjacent to the patient's left side) and a second side end 36 (e.g., adjacent to the patient's right side).

In the representative embodiment illustrated herein, the litter 22 generally includes a support frame 38 configured to support the patient support deck 24. It will be appreciated that the support frame 38 may take on various configurations and may include a variety of components. For example, in FIG. 1, the support frame 38 includes longitudinal rails 40 which extend between the first and second litter ends 30, 32. In some embodiments, additional components or features of the patient support apparatus 20 may be directly or indirectly coupled to one or mor longitudinal rails 40. In the example shown in FIG. 1, the litter 22 includes a foot end handle 42 coupled at the second litter end 32 and arranged for user engagement. The illustrated foot end handle 42 includes various grip regions arranged for user engagement (not shown in detail). However, it will be appreciated that the litter 22 could have other configurations without departing from the scope of the present disclosure, and may employ different types of handles or grip regions arranged at other locations about the patient support apparatus 20. In some embodiments, the handles or grip regions may be similar to as is described in U.S. Pat. No. 10,369,063, titled "Patient Transport Apparatus with Adjustable Handles," the disclosure of which is hereby incorporated by reference in its entirety. Other configurations are contemplated.

The illustrated support frame 38 also supports loading wheels 44 adjacent to the first end 30 of the litter 22. As shown in FIG. 1, the loading wheels 44 may extend from the support frame 38 proximal to the back section 26 of the patient support deck 24, and are employed to facilitate loading and unloading of the patient support apparatus 20 from a vehicle. In some embodiments, the loading wheels 44 may be positioned and configured to facilitate loading and unloading the patient support apparatus 20 into an ambulance. The support frame 38 may also support side rails (not shown) arranged as egress barriers for the patient on the patient support deck 24, and may also employ grips or handles arranged for engagement by a caregiver (e.g., an emergency medical technician (EMT), or another medical professional) to move or manipulate the patient support apparatus 20. In some embodiments, the side rails include a hinge, pivot, or similar mechanism to allow the side rails to be adjustably positioned relative to the patient support deck 24. The support frame 38 may support one or more vertical support members (not shown) configured to hold a medical device or medication delivery system, such as a bag of fluid to be administered via an intravenous line. The vertical support member may also be configured for the operator of the patient support apparatus 20 to push or pull on the vertical support member to manipulate or move the patient support apparatus 20. Other configurations are contemplated.

Figure 3A:
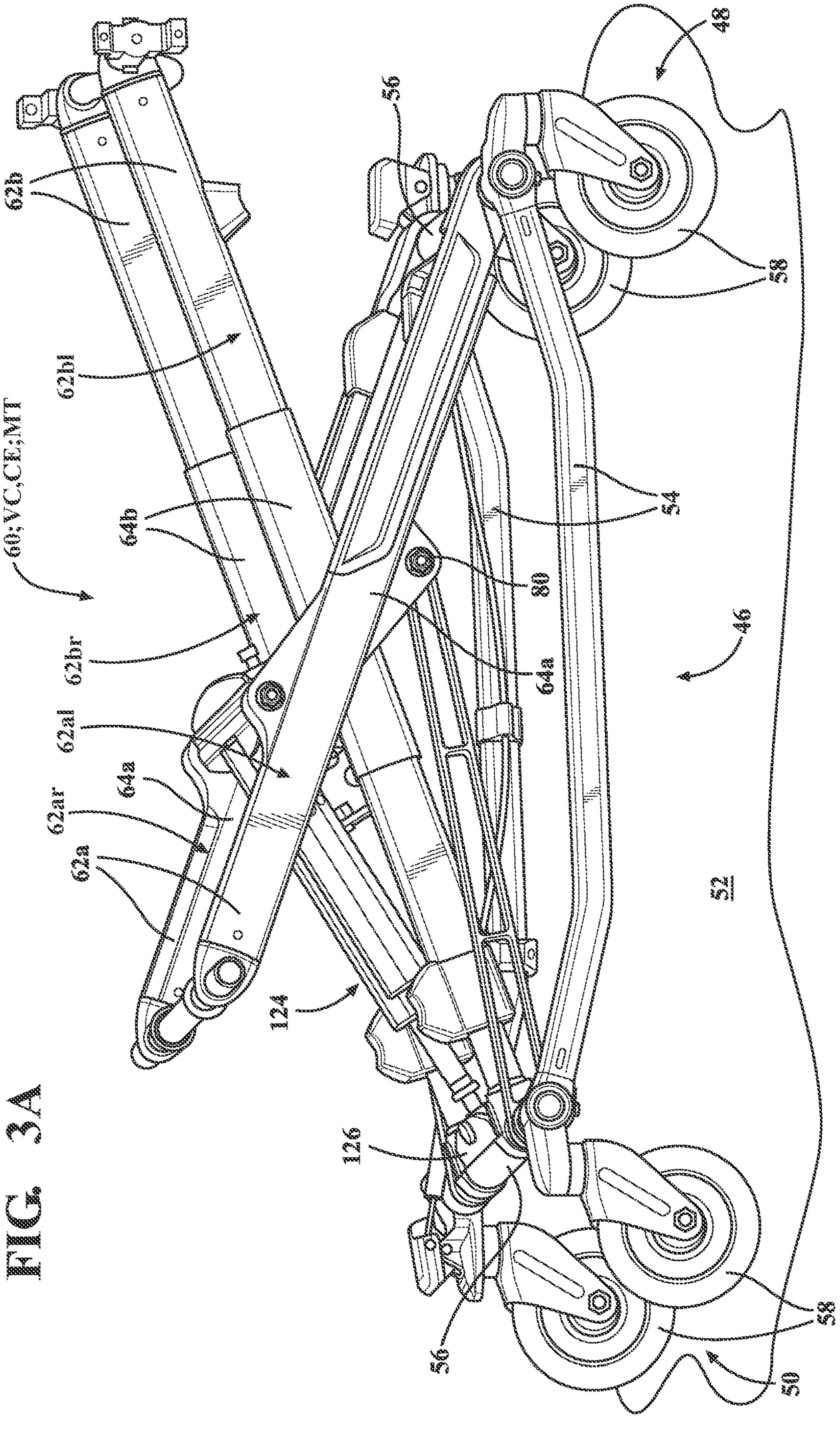
FIG. 3A is a perspective view of a portion of the patient support apparatus of Figure A, shown with the lift mechanism depicted in an extended configuration.
Figure 3B:
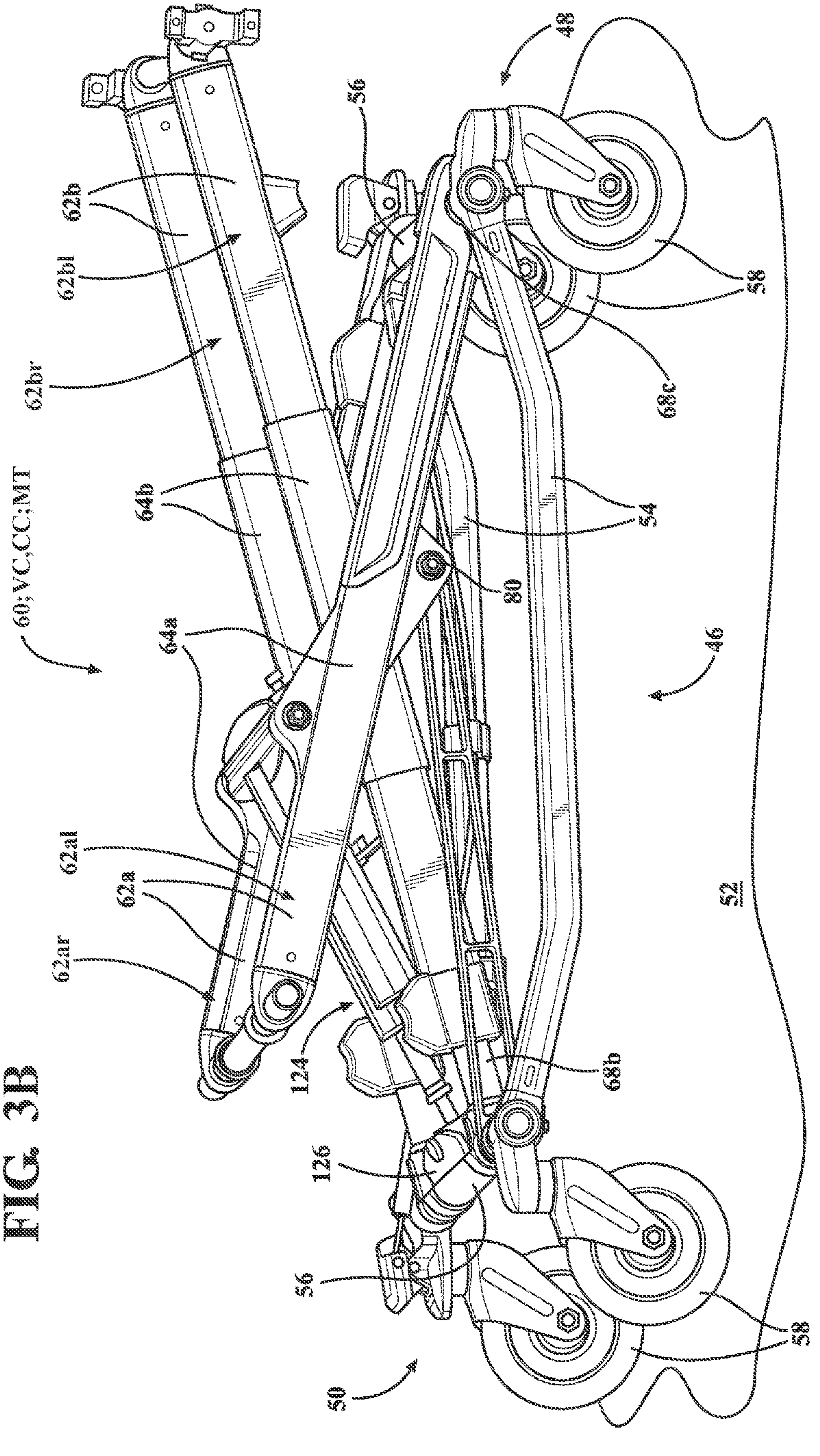
FIG. 3B is another perspective view of the portion of the patient support apparatus of FIG. 3A, shown with the lift mechanism depicted in a collapsed position.

As is best shown in FIGS. 1 and 3A-3B, the patient support apparatus 20 also generally includes a base 46 disposed below the litter 22. The base 46 extends longitudinally between a first base end 48 proximate the first litter end 30, and a second base end 50 proximate the second litter end 32. The base 46 is arranged to support the litter 22 and is configured to engage a floor surface 52. The base 46 may include longitudinally-extending rails 54 extending between the first and second base ends 48, 50 and crosswise-extending rails 56 coupled to the longitudinally-extending rails 54. In this representative, illustrative embodiment, the base 46 has a generally rectangular profile. However, it will be appreciated that the base 46 may have other configurations sufficient to support the litter 22, as described in greater detail below, without departing from the scope of the present disclosure.

In the representative embodiments illustrated herein, the base 46 includes a plurality of caster wheel assemblies 58 operatively connected adjacent to each corner of the base 46 defined by the longitudinally-extending rails 54 and the crosswise-extending rails 56. The wheel assemblies may be configured to swivel to facilitate turning of the patient support apparatus 20. The wheel assemblies may include a swivel locking mechanism to prevent the wheel assemblies from swiveling when engaged. The wheel assemblies may also include wheel brakes to prevent rotation of the wheel. However, other configurations are contemplated, and it will be appreciated that any suitable number of caster wheel assemblies 58, or other types of wheels (e.g., powered, non-powered) or other movement-promoting systems (e.g., treads) may be utilized without departing from the scope of the present disclosure.

As shown in FIG. 1, the patient support apparatus 20 also comprises a lift mechanism 60 extending between the litter 22 and the base 46 to effect relative movement between the litter 22 and the base 46 between a plurality of vertical configurations VC, including a collapsed configuration CC (e.g., as is depicted schematically in FIGS. 2A and 2D), an extended configurations CE (e.g., as is depicted schematically in FIGS. 2B-2C), as well as additional vertical configurations VC between the collapsed configuration CC and the extended configuration CE. As will be appreciated from the subsequent description below, in addition to being configured for selective (e.g., user-selected) operation for moving between different vertical configurations VC, the lift mechanism 60 is also operable between a transport mode MT (see FIGS. 2A-2B) and a suspended mode MS (see FIGS. 2C-2D). In the transport mode MT, the base 46 is disposed in engagement with the floor surface 52 (e.g., via contact between the wheel assemblies 58 and the ground) and supports the litter 22 for movement relative to the base 46 (compare FIGS. 2A-2B). In the suspended mode MS, the base 46 is spaced from the floor surface 52, and the litter 22 supports the base 46 (e.g., via contact between the loading wheels 44 and the floor of an ambulance cargo area) for movement relative to the litter 22 (compare FIGS. 2C-2D). Thus, the lift mechanism 60 can move between the different vertical configurations VC when the patient support apparatus 20 is utilized in either the transport mode MT or the suspended mode MS.

Figure 2A:
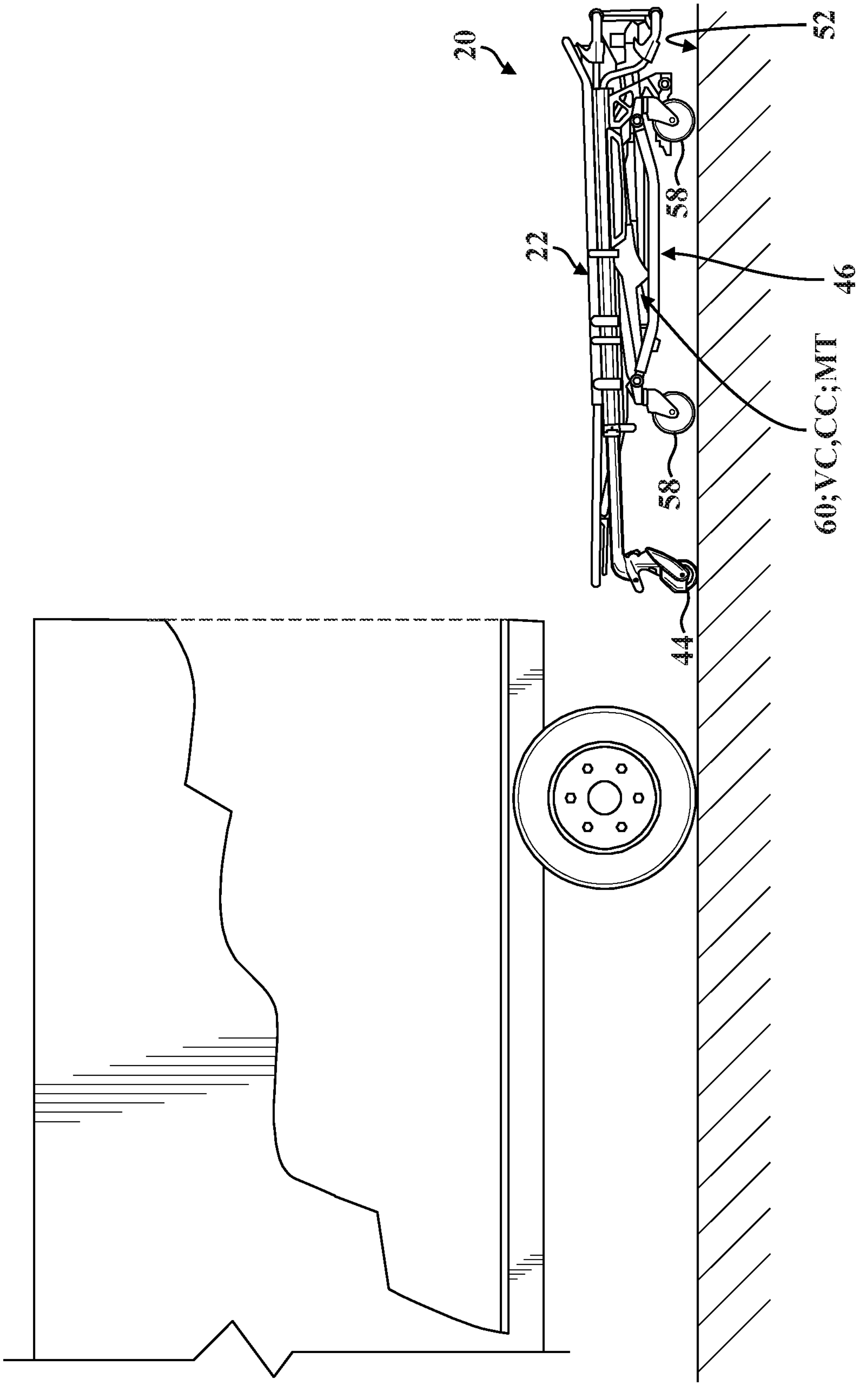
FIG. 2A is a schematic side view of a patient support apparatus positioned adjacent to an ambulance, the patient support apparatus shown having a lift mechanism extending between a litter and a base, with the lift mechanism depicted operating in a transport mode while in a collapsed configuration with the base engaging the floor surface and supporting the litter adjacent to the floor surface.
Figure 2B:
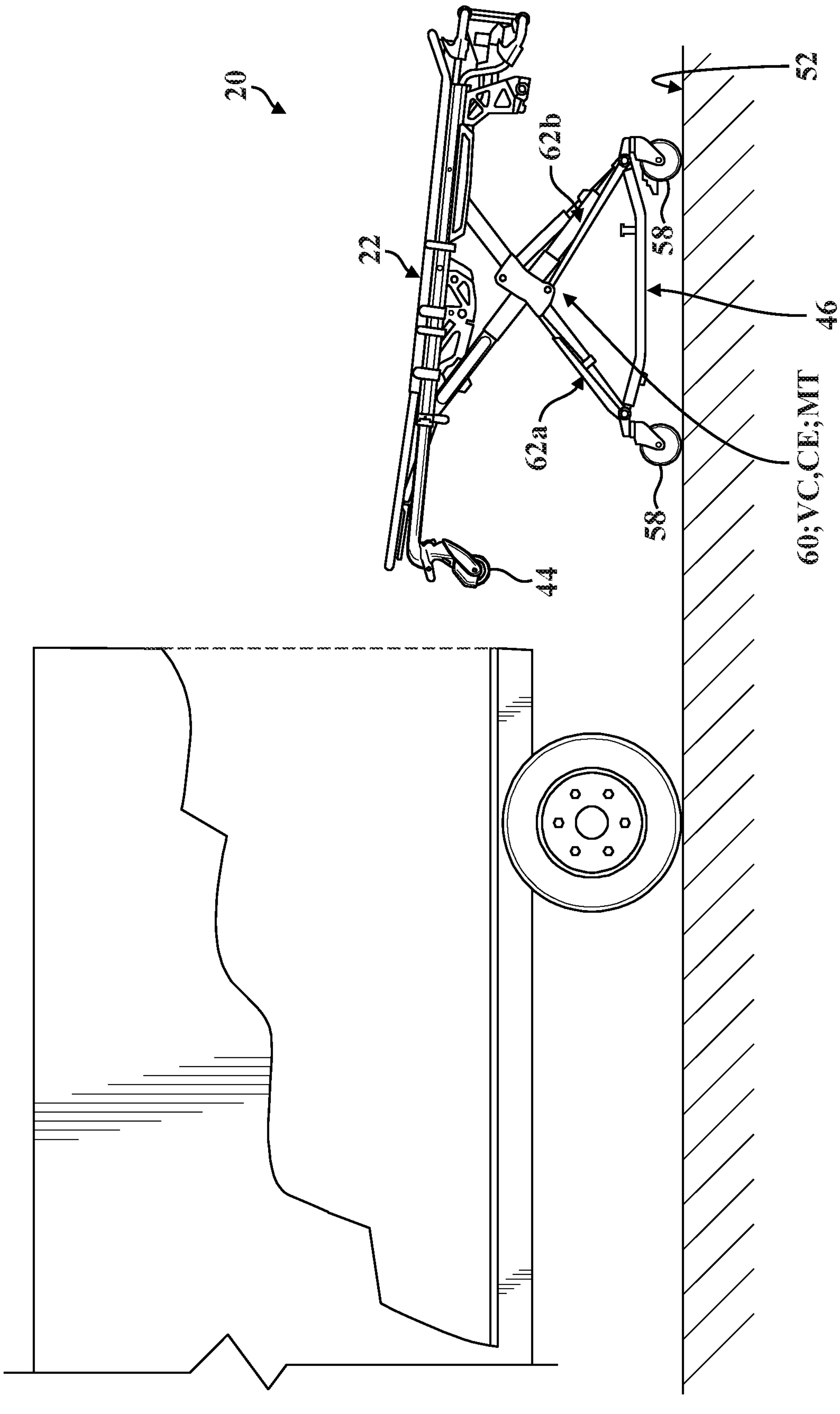
FIG. 2B is another schematic side view of the patient support apparatus and the ambulance of FIG. 2A, shown with the lift mechanism depicted in the transport mode while in an extended configuration with the base still engaging the floor surface and supporting the litter vertically above the floor surface for loading into the ambulance.
Figure 2C:
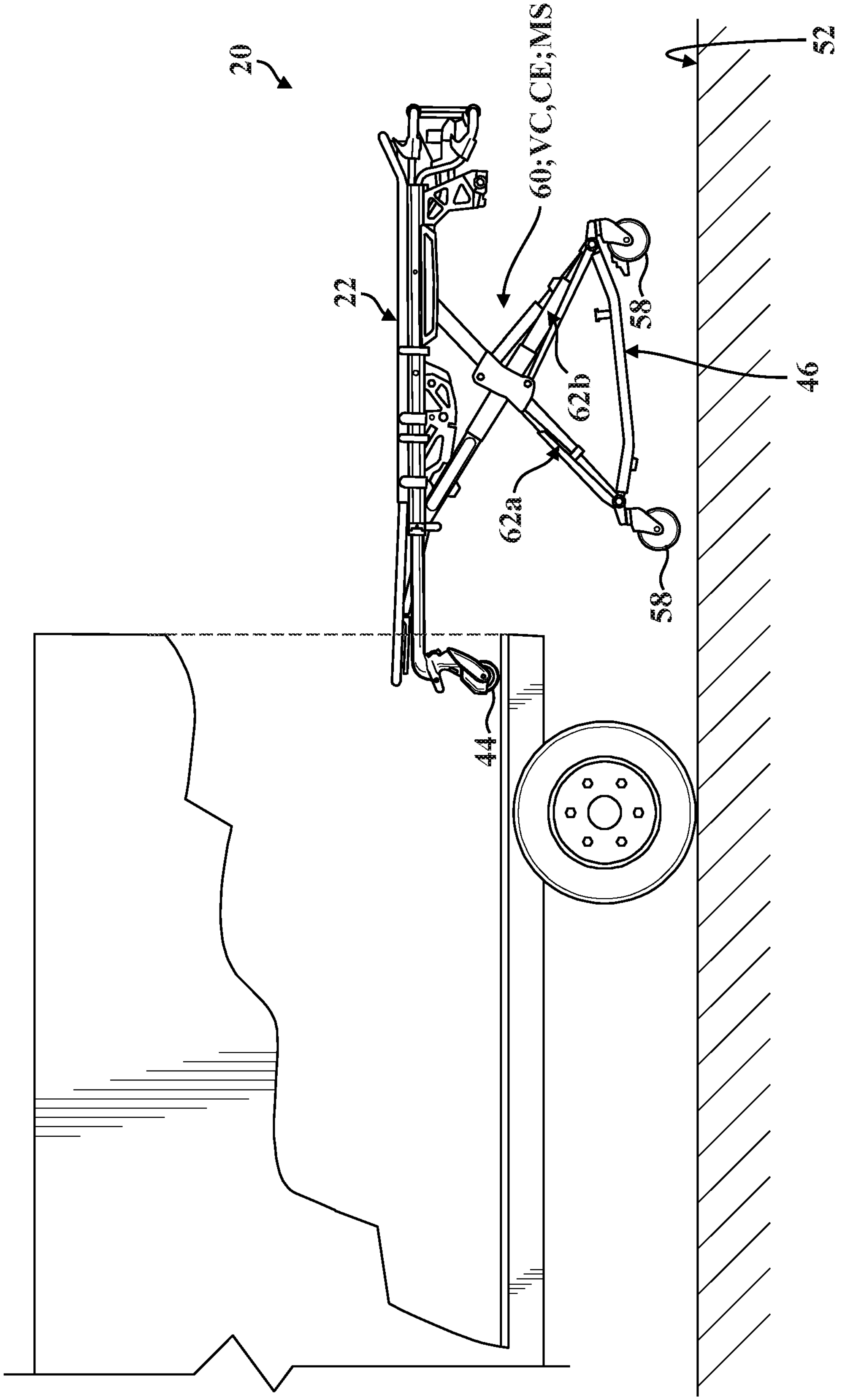
FIG. 2C is another schematic side view of the patient support apparatus and the ambulance of FIGS. 2A-2B, shown with the lift mechanism depicted operating in a suspended mode while still in the extended configuration and with a loading wheel coupled to the litter placed on an ambulance floor surface of the ambulance to support the litter with the base spaced from the floor surface.
Figure 2D:
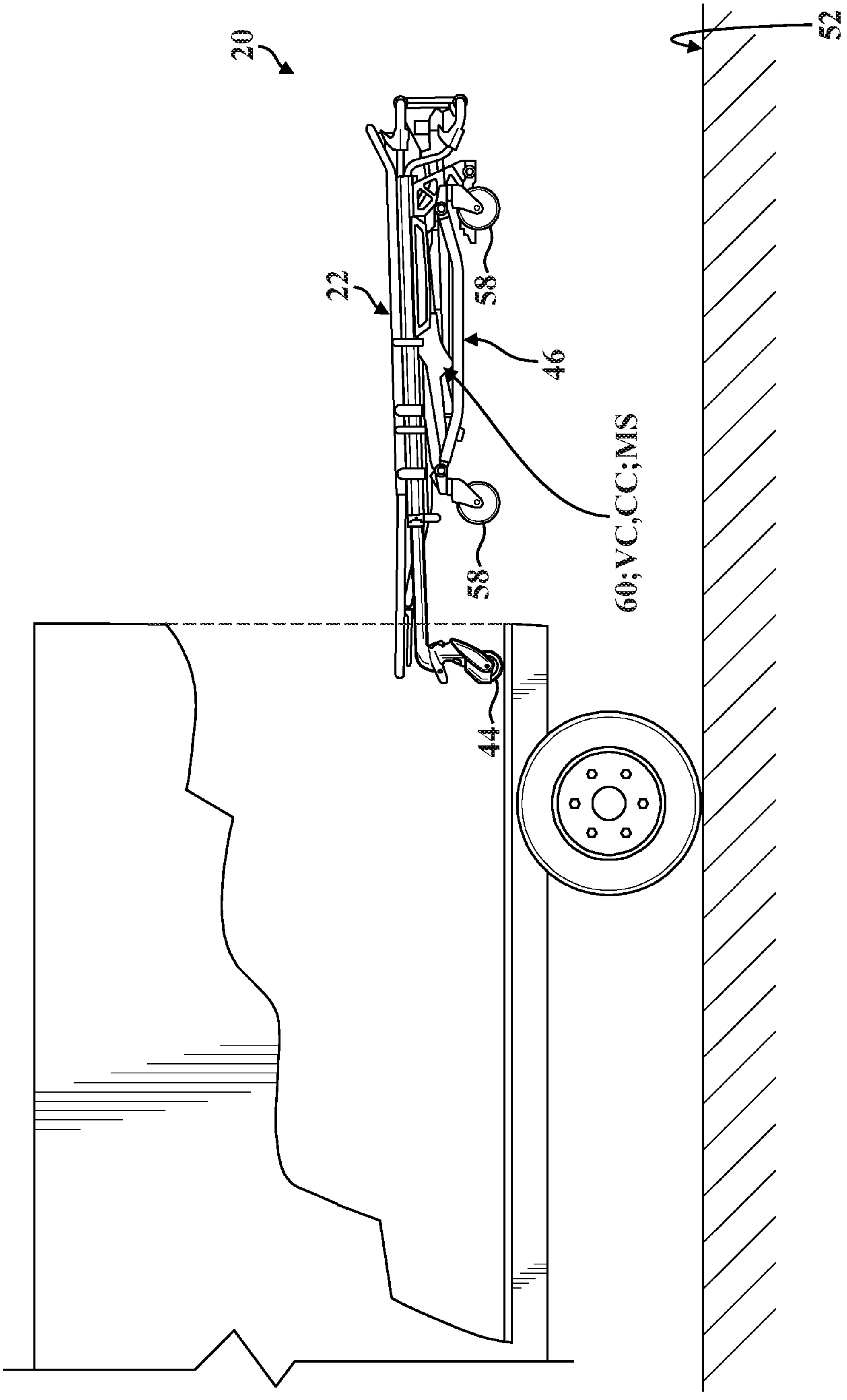
FIG. 2D is another schematic side view of the patient support apparatus and the ambulance of FIGS. 2A-2C, shown with the lift mechanism depicted operating in the suspended mode while in the collapsed configuration and with a loading wheel still placed on the ambulance floor surface of the ambulance to support the litter with the base still spaced from the floor surface.
Figure 4:
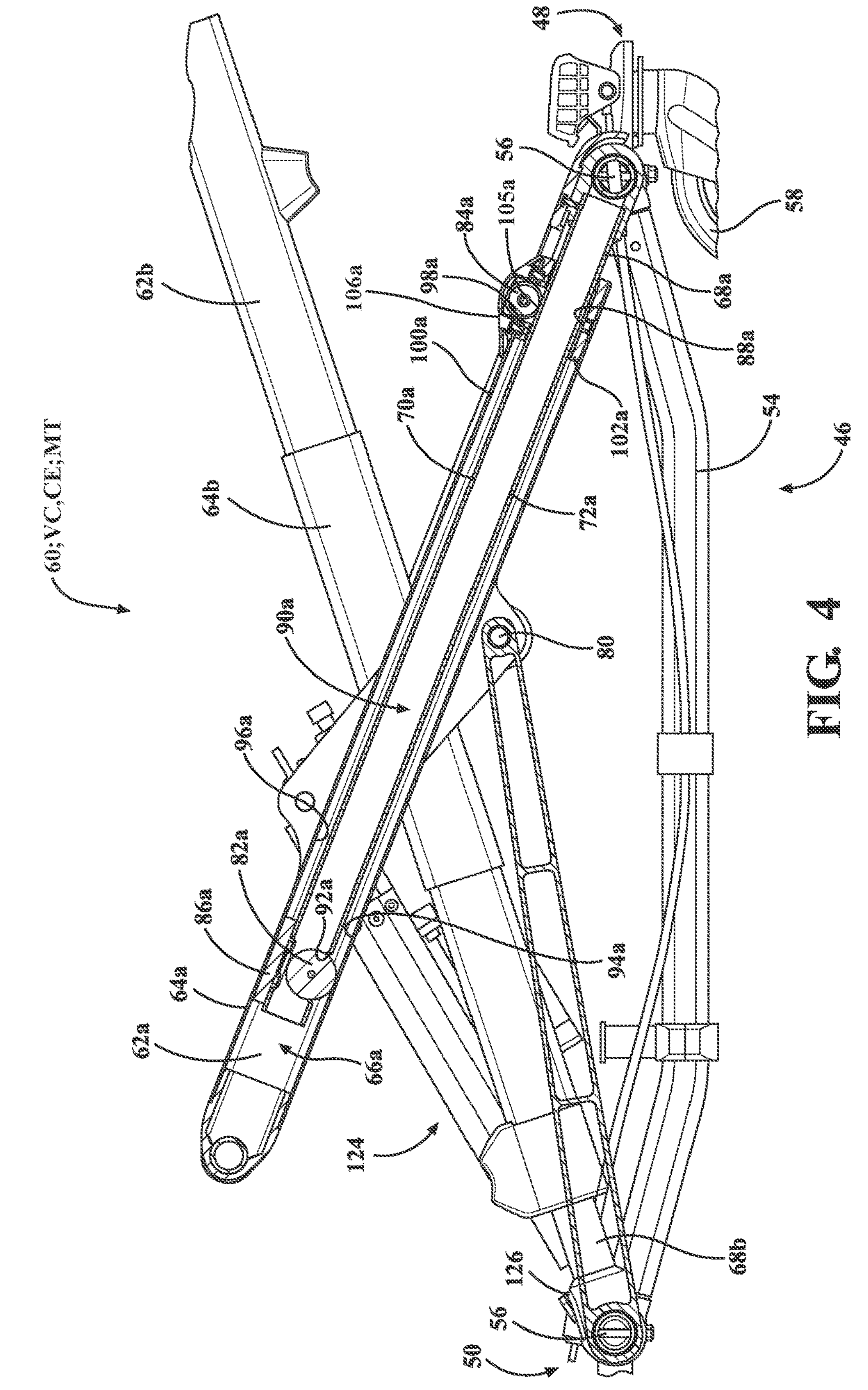
FIG. 4 is a partial sectional view of a first frame assembly of the lift mechanism of the patient support apparatus of FIGS. 3A-3B, shown arranged in the extended configuration of FIG. 3A.
Figure 5:
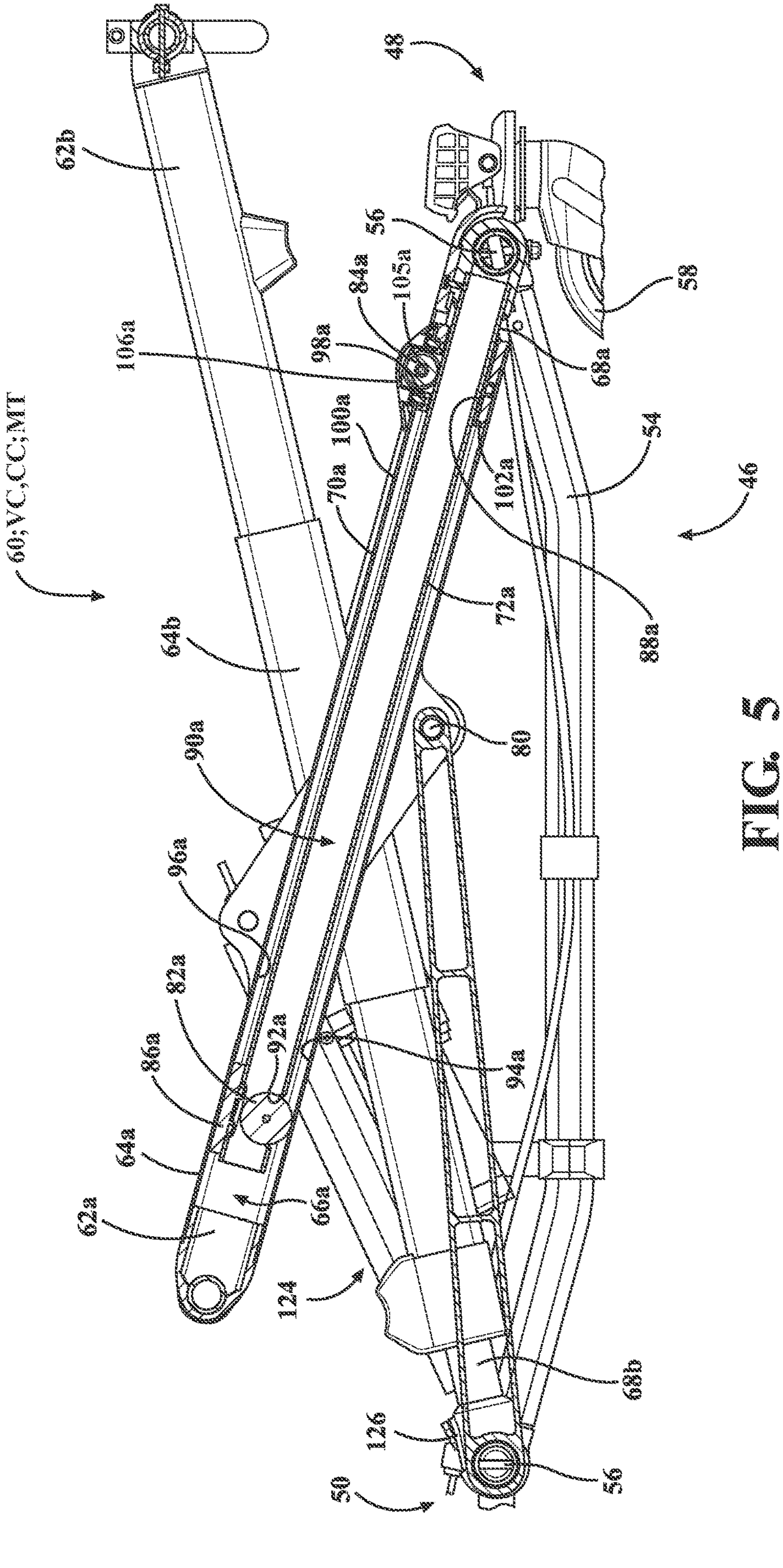
FIG. 5 is another partial sectional view of the first frame assembly of the lift mechanism of FIG. 4, shown arranged in the collapsed configuration of FIG. 3B.
Figure 6:
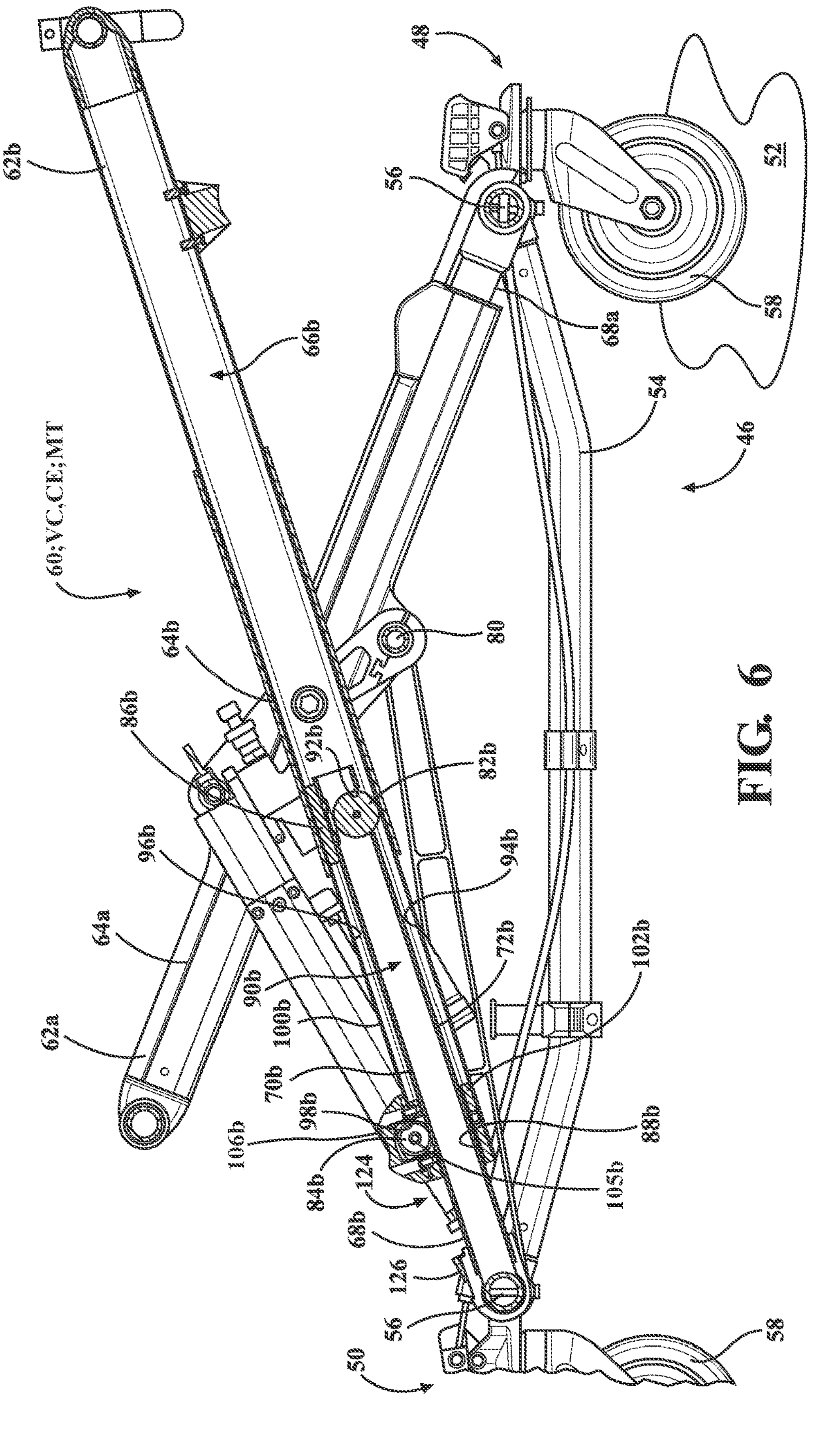
FIG. 6 is a partial sectional view of a second frame assembly of the lift mechanism of the patient support apparatus of FIGS. 3A-3B, shown arranged in the extended configuration of FIG. 3A.
Figure 7:
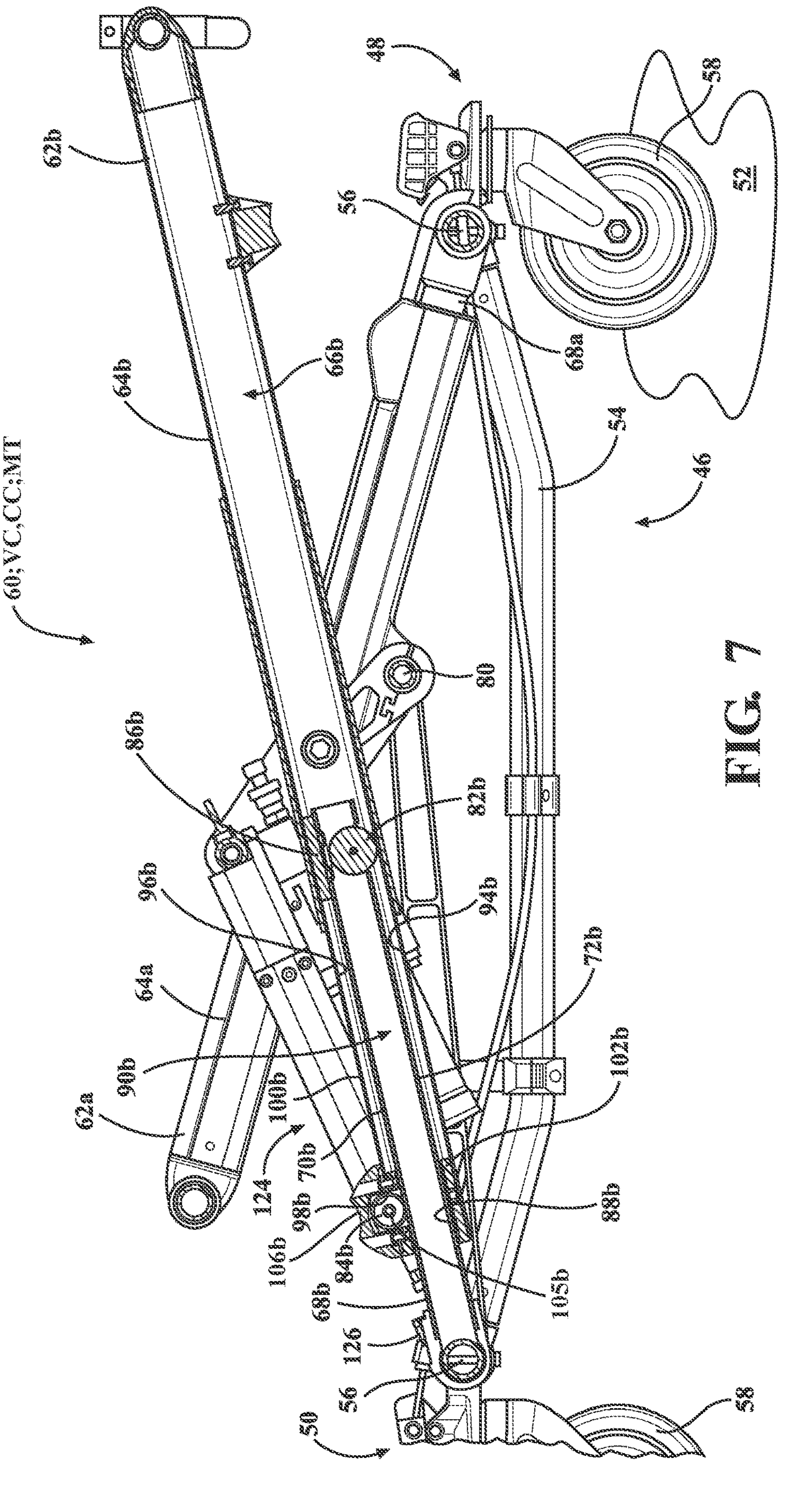
FIG. 7 is another partial sectional view of the second frame assembly of the lift mechanism of FIG. 6, shown arranged in the collapsed configuration of FIG. 3B.
Figure 10:
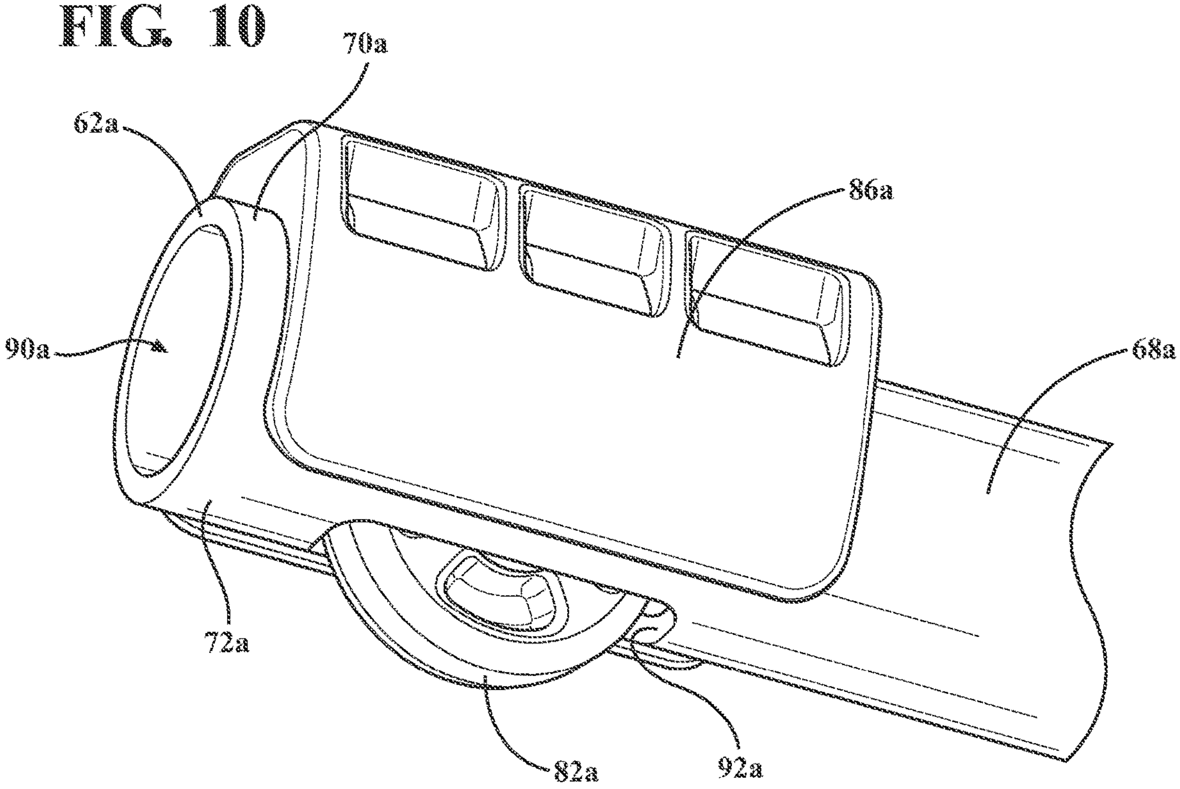
FIG. 10 is an enlarged, partial perspective view of the inner frame member, the first roller, and the first slide member of FIG. 8.
Figure 11:
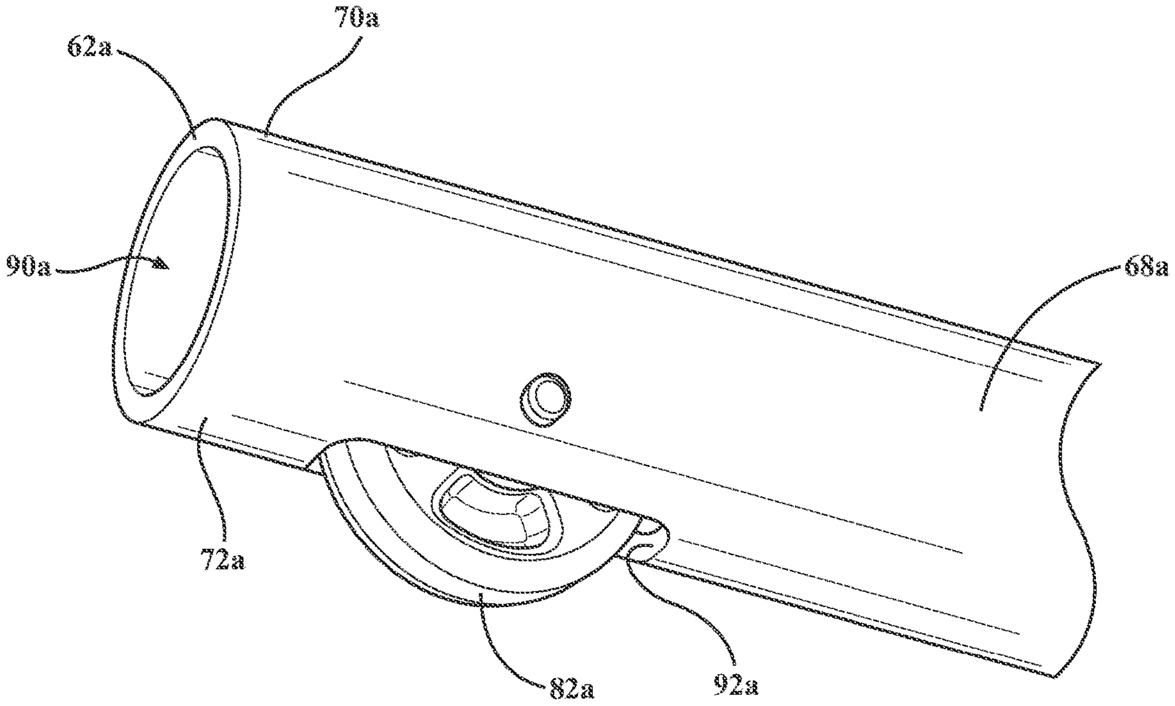
FIG. 11 is another enlarged, partial perspective view of the inner frame member and the first roller of FIG. 10 shown without the first slide member.

FIGS. 2A and 2D schematically depict a "maximum" or "near-maximum" collapsed configuration CC with the litter 22 arranged generally adjacent to (and partially nested over) the base 46, while FIGS. 2B-2C schematically depict a "maximum" or "near-maximum" extended configuration CE with the litter 22 arranged vertically above the base 46. As will be appreciated from the subsequent description below, various vertical configurations VC are contemplated by the present disclosure, including other collapsed configurations CC and/or other extended configurations CE (e.g., other than "maximum" or "near-maximum" configurations). For example, FIGS. 3A, 4, and 6 each depict an extended configuration CE that is "lower" than the schematic representation shown in FIGS. 2B-2C, and FIGS. 3B, 5, and 7 each depict a collapsed configuration that is "higher" than the schematic representation shown in FIGS. 2A and 2D. Thus, in embodiments consistent with the present disclosure, the litter 22 is arranged further away from the base 46 in the extended configuration CE than in the collapsed configuration CC. Accordingly, it will be appreciated that the terms "collapsed" and "extended" are used herein for illustrative, non-limiting purposes, and do not necessarily refer to a specific, discrete vertical configuration VC.

The extended configuration CE generally refers to an arrangement of the lift mechanism 60 where the distance between the base 46 and the litter 22 is relatively large (more specifically, larger than the collapsed configuration CC). The extended configuration CE may be utilized when a patient is laying on the patient support deck 24 in a hospital room or other non-transport setting, or when the patient is being transported by a caregiver between locations (e.g., between an ambulance and a hospital setting). In some embodiments, the extended configuration CE may be referred to as a transport configuration (e.g., defined such as a vertical configuration VC that is not necessarily a "maximum" extended configuration CE). In the collapsed configuration CC, on the other hand, the distance between the base 46 and the litter 22 is relatively small (more specifically, smaller than the extended configuration CE). The collapsed configuration CC may be utilized when the patient support apparatus 20 is being/has been loaded into an ambulance, or when the caster wheel assemblies 58 coupled to the base 46 are not otherwise utilized to move along floor surfaces 52 (e.g., when the patient support apparatus 20 is carried by multiple caregivers across rough terrain).

While moving between the vertical configuration VC, the lift mechanism 60 may move either the base 46 or the litter 22 relative to the other of the litter 22 or the base 46 depending on how the patient support apparatus 20 is supported during use (e.g., operating in the transport mode MT or the suspended mode MS). In instances where the patient support apparatus 20 is supported at the litter 22 (e.g., in the suspended mode MS), the lift mechanism 60 effectively moves the base 46 relative to (e.g., for movement towards or away from) the litter 22 between the plurality of vertical configurations VC. In instances where the patient support apparatus 20 is supported at the base 46 (e.g., in the transport mode MT), the lift mechanism 60 effectively moves the litter 22 relative to (e.g., for movement towards or away from) the base 46 between the plurality of vertical configurations.

Referring now to FIGS. 1-7, the lift mechanism 60 generally comprises a frame assembly (more specifically, a first frame assembly **62*a* and a second frame assembly 62*b*) extending between the litter 22 and the base 46 to facilitate movement between the plurality of vertical configurations VC. To this end, the first and second frame assemblies 62*a*, 62*b* are each pivotably coupled to each of the base 46 and the litter 22. More specifically, the first frame assembly 62*a* is pivotally coupled to the base 46 proximate the first base end 48, and is pivotally coupled (and, as is described in greater detail below, also slidably coupled) to the litter 22 proximate the second litter end 32; while the second frame assembly 62*b* is pivotally coupled to the base 46 proximate the second base end 50, and is pivotally coupled to the litter 22 proximate the first litter end 30. In the representative embodiments illustrated herein, and as is depicted in FIGS. 3A-3B, the first and second frame assemblies 62*a*, 62*b* are arranged in a X configuration, and each has a respective left frame subassembly 62*al*, 62*bl* and a respective right frame subassembly 62*ar*, 62*br***.

The left frame subassemblies **62*al*, 62*bl* and the right frame subassemblies 62*ar*, 62*br* are spaced laterally from each other and are generally configured as "mirrored" or otherwise complimentarily-configured and laterally-spaced versions of each other, and have corresponding structural features and components which facilitate concurrent, linked, and stable motion as the lift mechanism 60 moves between the plurality of vertical configurations VC. As will be appreciated from the subsequent description below, many of the components and structural features of the first and second frame assemblies 62*a*, 62*b* employ similar configurations to each other. Here, while specific differences between the first and second frame assemblies 62*a*, 62*b* will be explained in detail, it will be appreciated that the first and second frame assemblies 62*a*, 62*b* may each utilize multiple components that have similar or even identical configurations (e.g., one component associated with the left frame subassembly 62*al*, 62*bl* and another corresponding component associated with the respective right frame subassembly 62*ar*, 62*br*). Accordingly, for the purposes of clarity, consistency, and brevity, subsequent description of the lift mechanism 60 will generally employ discrete reference numerals for the components and structural features of the first frame assembly 62*a*, and similar but discrete reference numerals for the corresponding components and structural features of the second frame assembly 62*b*, but will not otherwise delineate further between the left frame subassemblies 62*al*, 62*bl* and the right frame subassemblies 62*ar*, 62*br*. Put differently, the drawings and description below may make reference to certain components and structural features which are utilized on both the left frame subassemblies 62*al*, 62*bl* and the right frame subassemblies 62*ar*, 62*br*, which may only be introduced a single time as being part of the first and/or second frame assemblies 62*a*, 62*b***; these are to be considered as separate but corresponding parts of the left and right frame subassemblies unless otherwise indicated.

As is best shown in FIGS. 4-7, each of the first and second frame assemblies 62*a*, 62*b* generally comprises an outer frame member 64*a*, 64*b* defining an interior 66*a*, 66*b*, and an inner frame member 68*a*, 68*b* arranged to move within the interior 66*a*, 66*b* of the outer frame member 64*a*, 64*b* when the litter 22 and the base 46 move relative to one another between the plurality of vertical configurations VC. The inner frame member 68*a*, 68*b* generally includes an upper exterior surface 70*a*, 70*b* facing towards the litter 22, and an opposing lower exterior surface 72*a*, 72*b* facing towards the base 46.

As noted above, and as is best depicted in FIG. 1, the first frame assembly 62*a* is pivotally and slidably (or translatably) coupled to the litter 22. To this end, and in the representative embodiment illustrated herein, the first frame assembly 62*a* includes a slide interface 74 coupled to the outer frame member 64*a*, and a guide body 76 defining a channel 78 is coupled to the litter 22. The slide interface 74 is disposed within the channel 78 of the guide body 76 for pivoting movement within the channel 78, and for sliding movement along the channel 78, as the lift mechanism 60 moves between the plurality of vertical configurations VC.

The guide body 76 may be coupled to a variety of locations on the litter 22. For example, as shown best in FIG. 1, the guide body 76 may be coupled to the support frame 38. More specifically, in the illustrated example, the guide body 76 is coupled to an underside of the longitudinal rail of the support frame 38 of the litter 22 adjacent to the second litter end 32. As the slide interface 74 moves between the plurality of different positions within the channel 78, the lift mechanism 60 moves between the plurality of vertical configurations VC. In this way, movement of the slide interface 74 in the channel 78 corresponds to movement between the vertical configurations VC. In the illustrated embodiment depicted in FIG. 1, the channel 78 has a curvilinear profile defined by a "linear" region that the slide interface 74 moves along as the lift mechanism 60 moves towards the extended configuration CE, and also by a "curved" region that the slide interface 75 moves along as the lift mechanism approaches the extended configuration CE. However, it will be appreciated that other configurations are contemplated, and the channel 78 may have various configurations, profiles, shapes, and the like, including without limitation straight, zig-zag, S-shaped, curved, diagonal/sloped, or any combination thereof.

The first and second frame assemblies 62*a*, 62*b* may be pivotally coupled to one another between the litter 22 and the base 46 such that the first and second frame assemblies 62*a*, 62*b* are arranged in an X configuration. To this end, the first frame assembly 62*a* and the second frame assembly 62*b* may be pivotally coupled to each other at a pivot axle 80 (see FIGS. 4-7) to form an X-frame. More specifically, the outer frame members 64*a*, 64*b* of the first and second frame assemblies 62*a*, 62*b* may be pivotally coupled to each other at the pivot axle 80.

The outer frame members 64*a*, 64*b* of each of the frame assemblies 62*a*, 62*b* are generally hollow and support the inner frame members 68*a*, 68*b* for movement. More specifically, the inner frame members 68*a*, 68*b* are supported for movement within the outer frame members 64*a*, 64*b* to extend and retract the frame assemblies 62*a*, 62*b*. In the representative embodiments shown in FIGS. 4-7, the inner frame members 68*a*, 68*b* extend out of the outer frame members 64*a*, 64*b* toward the base 46. As such, the inner frame members 68*a*, 68*b* of each of the first and second frame assemblies 62*a*, 62*b* are pivotally coupled to the base 46. Similarly, the outer frame members 64*a*, 64*b* of each of the first and second frame assemblies 62*a*, 62*b* are pivotally coupled to the litter 22. More specifically, the inner frame members 68*a*, 68*b* are coupled to the base 46, and the outer frame members 64*a*, 64*b* are coupled to the support frame 38 of the litter 22. However, it will be appreciated that other configurations are contemplated and, in some embodiments, the inner frame members 68*a*, 68*b* may extend out of outer frame members 64*a*, 64*b* toward the support frame 38 (not shown). Here, the frame assemblies may be operatively attached to the base 46 or to the support frame 38 via the inner frame members 68*a*, 68*b*. However, in other embodiments, one or more of the frame assemblies may be of a fixed length and, thus, could exclude the inner frame member 68*a*, 68*b*. Other configurations are contemplated.

As shown in FIGS. 4-7, the first and second frame assemblies 62*a*, 62*b* each generally comprise first rollers 82*a*, 82*b* and second rollers 84*a*, 84*b*, as well as first slide members 86*a*, 86*b* and second slide members 88*a*, 88*b*, disposed between the outer frame members 64*a*, 64*b* and the inner frame members 68*a*, 68*b*. The first rollers 82*a*, 82*b* and the first slide members 86*a*, 86*b* are arranged adjacent one another. The first rollers 82*a*, 82*b* are disposed along the respective lower exterior surfaces 72*a*, 72*b* of the inner frame members 68*a*, 68*b*, and the first slide members 86*a*, 86*b* are disposed along the upper exterior surfaces 70*a*, 70*b* of the respective inner frame members 68*a*, 68*b*. The second rollers 84*a*, 84*b* and the second slide members 88*a*, 88*b* are adjacent to each other, and are disposed in spaced relation from the first rollers 82*a*, 82*b* and the first slide members 86*a*, 86*b*. The second rollers 84*a*, 84*b* are disposed along the upper exterior surfaces 70*a*, 70*b* of the respective inner frame members 68*a*, 68*b*, and the second slide members 88*a*, 88*b* are disposed along the lower exterior surfaces 72*a*, 72*b* of the respective inner frame members 68*a*, 68*b*. Each of the components introduced above will be described in greater detail below.

With continued reference to FIGS. 4-7, the inner frame members 68*a*, 68*b* each generally include an inner chamber 90*a*, 90*b* extending longitudinally along the inner frame member 68*a*, 68*b*. In some embodiments, the inner frame members 68*a*, 68*b* may also define apertures 92*a*, 92*b* that opens into the inner chamber 90*a*, 90*b*. The first rollers 82*a*, 82*b* may be disposed within the respective inner chambers 90*a*, 90*b* and extend through the respective apertures 92*a*, 92*b* into rolling contact with a lower interior surface 94*a*, 94*b* of the outer frame members 64*a*, 64*b*, and may be spaced from an upper interior surface 96*a*, 96*b* of the outer frame members 64*a*, 64*b*. In some embodiments, the outer frame members 64*a*, 64*b* may define respective openings 98*a*, 98*b*, and the second rollers 84*a*, 84*b* may extend through the openings 98*a*, 98*b* into rolling contact with the upper exterior surface 70*a*, 70*b* of the inner frame members 68*a*, 68*b*.

To effect movement of the lift mechanism 60 between the plurality of vertical configurations VC according to embodiments of the present disclosure, the first slide members 86*a*, 86*b* are arranged for sliding contact with the upper interior surfaces 96*a*, 96*b* of the respective outer frame members 64*a*, 64*b*, while the second slide members 88*a*, 88*b* are arranged for sliding contact with the lower exterior surfaces 72*a*, 72*b* of the respective inner frame members 68*a*, 68*b*. Furthermore, the first rollers 82*a*, 82*b* are arranged for rolling contact with the lower interior surfaces 94*a*, 94*b* of the respective outer frame members 64*a*, 64*b*, while the second rollers 84*a*, 84*b* are arranged for rolling contact with the upper exterior surfaces 70*a*, 70*b* of the respective inner frame members 68, 68*b*. Here, when operating in the transport mode MT (see FIGS. 2A-2B) with the base 46 disposed in engagement with the floor surface 52 (e.g., via the caster wheel assemblies 58) and supporting the litter 22 for movement relative to the base 46, the first and second frame assemblies 62*a* 62*b* are loaded such that the rolling contact of the first rollers 82*a*, 82*b* and of the second rollers 84*a*, 84*b* transfers load from the litter 22 to the base 46. However, when operating in the suspended mode MS (see FIGS. 2C-2D) with the base 46 spaced from the floor surface 52 and with the litter 22 supporting the base 46 (e.g., via the loading wheels 44) for movement relative to the litter 22, the first and second frame assemblies 62*a*, 62*b* are loaded such that the sliding contact of the first slide members 86*a*, 86*b* and of the second slide members 88*a*, 88*b* transfers load from the base 46 to the litter 22.

In the embodiments shown in FIGS. 4-9, the first rollers 82*a*, 82*b* are rotatably coupled to the respective inner frame members 68*a*, 68*b* and are arranged to rotate along the lower interior surfaces 94*a*, 94*b* of the respective outer frame member 64*a*, 64*b* to reduce friction between the outer frame members 64*a*, 64*b* and the inner frame members 68*a*, 68*b*. Here too, the second rollers 84*a*, 84*b* are rotatably coupled to the respective outer frame members 64*a*, 64*b* and are arranged to rotate along the upper exterior surfaces 70*a*, 70*b* of the respective inner frame members 68*a*, 68*b* to reduce friction between the outer frame members 64*a*, 64*b* and the inner frame members 68*a*, 68*b*. Here, it will be appreciated that movement from the collapsed configuration CC to the extended configuration CE moves the first rollers 82*a*, 82*b* towards the respective second rollers 84*a*, 84*b* within the interiors 66*a*, 66*b* of the respective outer frame members 64*a*, 64*b*. Furthermore, the first slide members 86*a*, 86*b* are coupled to the respective inner frame members 68*a*, 68*b*, and the second slide members 88*a*, 88*b* are coupled to the respective outer frame members 64*a*, 64*b*. Here, it will be appreciated that movement from the collapsed configuration CC to the extended configuration CE moves the first slide members 86*a*, 86*b* towards the respective second slide members 88*a*, 88*b* within the interiors 66*a*, 66*b* of the respective outer frame members 64*a*, 64*b*.

As noted above, the first and second rollers 82*a*, 82*b*, 84*a*, 84*b* are each arranged to roll along at least one of the outer and inner frame members 64*a*, 64*b*, 68*a*, 68*b* to reduce friction therebetween and facilitate movement of the litter 22 and the base 46 relative to one another as the lift mechanism 60 selectively moves between the plurality of vertical configurations VC. Furthermore, the first and second slide members 86*a*, 86*b*, 88*a*, 88*b* are each arranged to slide along at least one of the outer and inner frame members 64*a*, 64*b*, 68*a*, 68*b* to reduce friction therebetween and facilitate movement of the litter 22 and the base 46 relative to one another as the lift mechanism 60 selectively moves between the plurality of vertical configurations VC. It will be appreciated that the lift mechanism 60 is configured for selective (e.g., user-selected) movement between the plurality of vertical configurations in the transport mode MT (compare FIGS. 2A-2B), as well as in the suspended mode MS (compare FIGS. 2C-2D).

An example of moving the litter 22 and the base 46 relative to one another between the vertical configurations VC with a load exerted on the lift mechanism 60 from the litter 22 occurs when a patient is disposed on the litter 22 and the base 46 is disposed on the floor surface 52 (e.g., operation in, the transport mode MT). Here, the lift mechanism 60 generally moves the litter 22 up and down relative to the base 46 supported the floor surface 52, and must overcome the load of the patient and the litter 22. An example of moving the litter 22 and the base 46 relative to one another between the vertical configurations VC with a load exerted on the lift mechanism 60 from the base 46 occurs when the litter 22 is being loaded into an ambulance or other type of emergency vehicle (e.g., operation in the suspended mode MS). Here, the lift mechanism 60 moves the base 46 up and down relative to the litter 22 that is supported on a bay floor of ambulance, and must overcome the load of the base 46.

While other configurations are contemplated, for the representative embodiments of the patient support apparatus 20 illustrated herein, the load exerted on the lift mechanism 60 from the litter 22 when in the transport mode MT is generally larger than the load exerted on the lift mechanism 60 from the base 46 in the suspended mode MS. Here too, it will be appreciated that, depending on the weight of the patient, the amount of load acting on the lift mechanism 60 in the in the transport mode MT may be significantly higher than when that same patient is supported on the litter 22 in the suspended mode MS. Here, utilization of the first rollers 82*a*, 82*b* and the second rollers 84*a*, 84*b* in the arrangement described above of facilitates greater friction reduction and ease of load transfer when compared to the first slide members 86*a*, 86*b* and the second slide members 88*a*, 88*b*. Put differently, the first rollers 82*a*, 82*b* and the second rollers 84*a*, 84*b* are configured to carry significantly higher load in the illustrated embodiments than the first slide members 86*a*, 86*b* and the second slide members 88*a*, 88*b*. However, it will also be appreciated that the first slide members 86*a*, 86*b* and the second slide members 88*a*, 88*b* are generally less expensive to manufacture, and can be utilized to facilitate sufficient friction reduction in relatively low-load situations (e.g., operation in the suspended mode MS). As such, the utilization of the first rollers 82*a*, 82*b* and the second rollers 84*a*, 84*b* reduces friction between the outer frame members 64*a*, 64*b* and the inner frame members 68*a*, 68*b* under the higher loads exerted by the litter 22 and the patient in the transport mode MT, while utilization of the first slide members 86*a*, 86*b* and the second slide members 88*a*, 88*b* reduces friction between the outer frame members 64*a*, 64*b* and the inner frame members 68*a*, 68*b* under the lower loads exerted by the base 46 in the suspended mode MS. Here, it will be appreciated that the arrangement of the first rollers 82*a*, 82*b*, the second rollers 84*a*, 84*b*, the first slide members 86*a*, 86*b*, and the second slide members 88*a*, 88*b* advantageously affords significant opportunities for reduced friction in different use case scenarios without necessitating that the lift mechanism 60 have a complex or bulky design. Thus, the lift mechanism 60 affords opportunities for reduced cost while ensuring consistent, reliable performance.

As noted above, in some embodiments, opening 98*a*, 98*b* may be formed in the outer frame members 64*a*, 64*b* in communication with the respective interiors 66*a*, 66*b* and with the second rollers 84*a*, 84*b* at least partially extending therethrough. In the representative embodiments illustrated herein, the outer frame members 64*a*, 64*b* generally include a tube 100*a*, 100*b* (see FIGS. 4-7, 14, and 15) and a carrier 102*a*, 102*b* (see FIGS. 4-7, 12, and 13) mounted to the tube 100*a*, 100*b*. Here, it will be appreciated that a portion of the tube 100*a*, 100*b* may generally define the opening 98*a*, 98*b*. The carrier 102*a*, 102*b* may be mounted to the tube 100*a*, 100*b* (e.g., via fasteners; not shown) proximate to the opening 98*a*, 98*b*. The tube 100*a*, 100*b* may include or otherwise define lateral walls 104*a*, 104*b* operatively attached thereto, arranged adjacent the opening 98*a*, 98*b* (see FIG. 15) and extending generally vertically towards the litter 22. Here, the lateral walls 104*a*, 104*b* support a roller shaft 105*a*, 105*b* extending over the opening 98*a*, 98*b* and rotatably supporting the second roller 84*a*, 84*b*. In this way, the second roller 84*a*, 84*b* is rotatably coupled to each of the lateral walls 104*a*, 104*b*, extends through the opening 98*a*, 98*b*, and is positioned in rolling contact with the upper exterior surface 70*a*, 70*b* of the inner frame member 68*a*, 68*b*.

As shown in FIG. 14, in some embodiments, covers 106*a*, 106*b* may releasably attached (e.g., via fasteners; not shown in detail) to the outer frame member 64*a*, 64*b*, and extend over the second rollers 84*a*, 84*b* to create a tortious path for ingress of contaminants towards the inner frame member 68*a*, 68*b* and to help prevent damage to the second rollers 84*a*, 84*b* and other components of the lift mechanism 60. In some embodiments, the covers 106*a*, 106*b* extend over at least a portion of the lateral walls 104*a*, 104*b*. It will be appreciated that the covers 106*a*, 106*b* could have a number of different shapes, configurations, profiles, and the like, and may be releasably attached to the outer frame members 64*a*, 64*b* (or to other parts of the lift mechanism 60, such as the carrier 102*a*, 102*b*) in a number of different ways without departing from the scope of the present disclosure.

Figure 12:
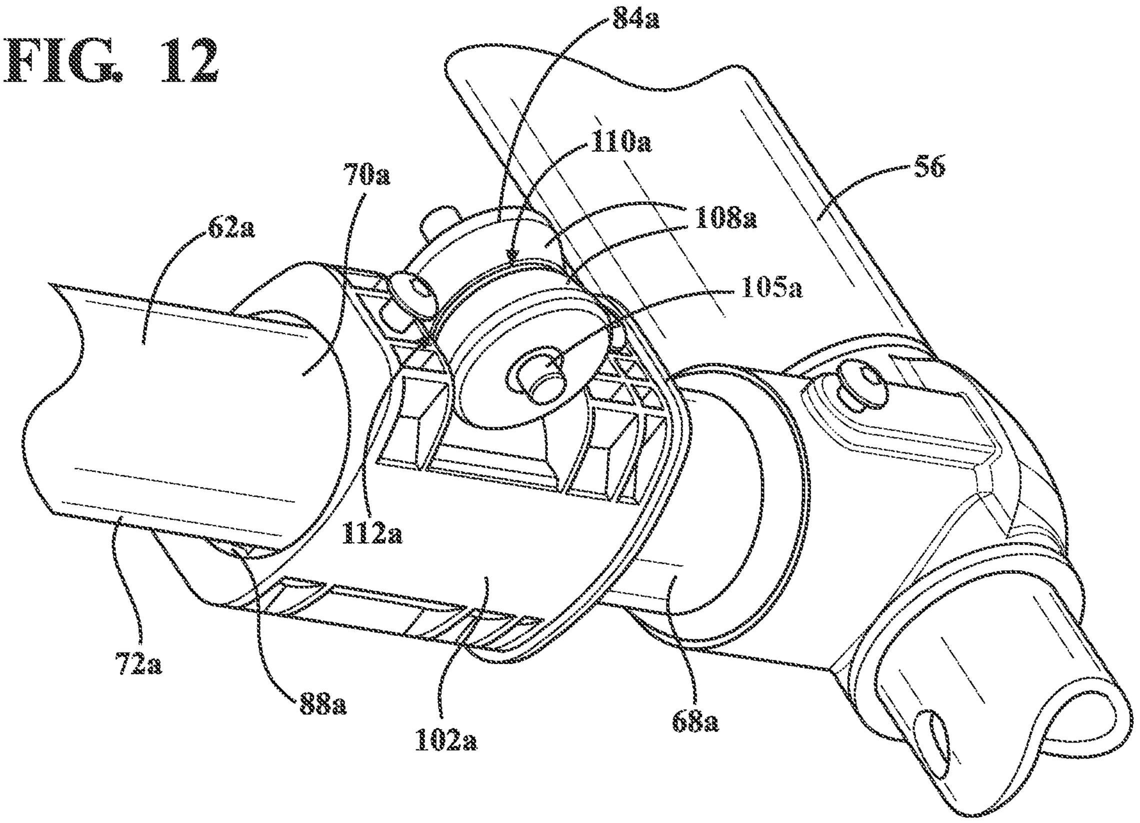
FIG. 12 is an enlarged, partial perspective view of the inner frame member, a carrier of the outer frame member, and the second roller of FIG. 9.
Figure 13:
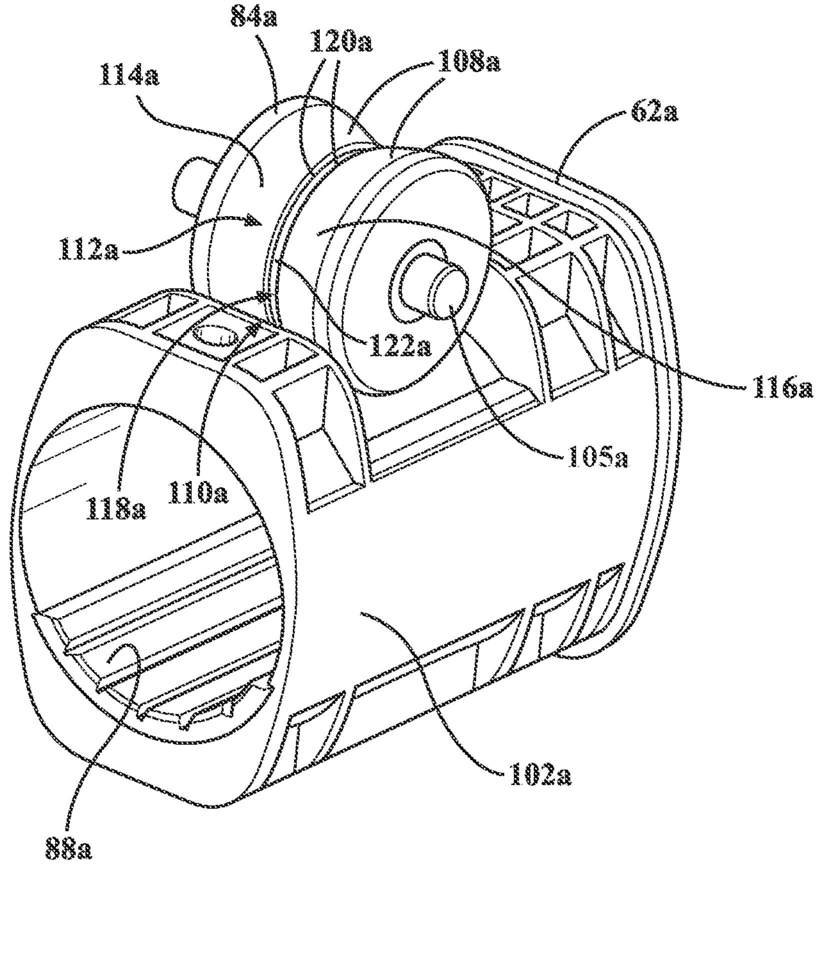
FIG. 13 is a perspective view of the carrier of the outer frame member and the second roller of FIG. 12.

As noted above, the second slide members 88*a*, 88*b* are arranged adjacent to the second rollers 84*a*, 84*b*. In the representative embodiment illustrated herein, and as is best depicted in FIGS. 12-13, the second slide members 88*a*, 88*b* may be formed as separate components from the carriers 102*a*, 102*b*, and may be releasably (or permanently) coupled thereto, such as with fasteners, adhesives, bonding, welding, and the like. In some embodiments, however, the second slide members 88*a*, 88*b* may be formed as parts of (e.g., formed integrally with) the carriers 102*a*, 102*b*. Other configurations are contemplated.

As shown in FIGS. 12-13 and 15, the second rollers 84*a*, 84*b* may define a pair of contact surfaces 108*a*, 108*b* each arranged for engagement with the upper exterior surface 70*a*, 70*b* of the inner frame member 68*a*, 68*b* which, in the illustrated embodiments, has a generally curved profile. The illustrated contact surfaces 108*a*, 108*b* have generally frustoconical profiles, but other configurations are contemplated. In some embodiments, the second rollers 84*a*, 84*b* also define respective voids 110*a*, 110*b* arranged between the contact surfaces 108*a*, 108*b* and shaped to collect contaminants, debris, and the like therein. In the representative embodiments illustrated herein, the second rollers 84*a*, 84*b* have the contact surfaces 108*a*, 108*b* and voids 110*a*, 110*b* described above, while the first rollers 82*a*, 82*b* have rounded profiles (e.g., rounded wheels). However, other configurations are contemplated, and the first rollers 82*a*, 82*b* could be provided with contact surfaces 108*a*, 108*b* and/or voids 110*a*, 100*b* in some embodiments.

The contact surfaces 108*a*, 108*b* of the second rollers 84*a*, 84*b* are generally skewed relative to one another and converge towards an apex 112*a*, 112*b* arranged adjacent to the void 110*a*, 110*b* to direct contaminants towards the apex 112*a*, 112*b* and into the void 110*a*, 110*b* as the second rollers 84*a*, 84*b* move in rolling contact along the upper exterior surfaces 70*a*, 70*b* of the respective inner frame members 68*a*, 68*b*. More specifically, the contact surfaces 108*a*, 108*b* are arranged in a generally V-shaped configuration. As shown in FIG. 13, the V-shaped contact surface is further defined as having a first inwardly sloping region 114*a*, 114*b* and a second inwardly sloping region 116*a*, 116*b* separated by a central grooved portion 118*a*, 118*b* that defines the void 110*a*, 110*b*. The central grooved portion 118*a*, 118*b* includes a pair of side portions 120*a*, 120*b* connected by a back portion 122*a*, 122*b* that collectively define the void 110*a*, 110*b*. The void 110*a*, 110*b* is designed to allow debris to accumulate in an area that is out of contact with the interface between the second roller 84*a*, 84*b* and the corresponding inner frame member 68*a*, 68*b*. It will be appreciated that the debris collecting configuration effected by the second rollers 84*a*, 84*b* promotes consistent smooth, sliding between the components of the first and second frame assemblies 62*a*, 62*b* as the lift mechanism 60 moves between the plurality of vertical configurations VC.

Those having ordinary skill in the art will appreciate that the lift mechanism 60 may move between the plurality of vertical configurations VC in response a caregiver selectively and manually applying force to facilitate operation or adjustment of the lift mechanism 60, or components thereof. Additionally, or alternatively, the patient support apparatus 20 may include one or more actuators 124, which may be coupled to any suitable component of the lift mechanism 60 and may be configured to selectively facilitate movement of the lift mechanism 60 between the plurality of vertical configurations VC in response to caregiver engagement with one or more user interfaces (not shown in detail). As shown in FIGS. 1 and 3A-7, the illustrated actuator 124 is realized as a hydraulic linear actuator connected to and extending between actuator brackets 126. However, it will be appreciate that other types of actuators 124, arranged in other ways, may be utilized in some embodiments without departing from the scope of the present disclosure. For example, the actuator 124 may be realized with one or more electric motors, pneumatic actuators, or any other suitable actuators 124.

In the representative embodiment illustrated in FIG. 1, actuator 124 generally includes a cylindrical housing (not shown in detail) fastened or otherwise secured to one of the actuator brackets 126, with the cylindrical housing supporting a reciprocal rod having a piston located within the cylindrical housing. A distal end of the reciprocal rod is connected by a joint to one of the actuator brackets 126. The joint allows pivotal movement about two orthogonally related axes. Extension and retraction of the reciprocal rod facilitates movement of the outer frame members 64*a*, 64*b* of the lift mechanism 60 about the axis of the reciprocal rod. Similar actuators 124 are described in U.S. Pat. No. 7,398,571, titled "Ambulance Cot and Hydraulic Elevating Mechanism Therefor," the disclosure of which is hereby incorporated by reference in its entirety. Furthermore, techniques for utilizing actuators 124 to manipulate the components of patient support apparatuses 20 can be similar to those described in United States Patent Application Publication No. US2018/0303689A1, titled "Emergency Cot with Litter Height Adjustment Mechanism," the disclosure of which is hereby incorporated by reference in its entirety.

Several embodiments have been discussed in the foregoing description. However, the embodiments discussed herein are not intended to be exhaustive or limit the invention to any particular form. The terminology which has been used is intended to be in the nature of words of description rather than of limitation. Many modifications and variations are possible in light of the above teachings and the invention may be practiced otherwise than as specifically described.

What is claimed is:

1. A patient transport apparatus for supporting a patient, the patient transport apparatus comprising:

a litter comprising a patient support deck configured to support the patient;

a base configured to engage a floor surface; and a lift mechanism extending between the litter and the base to effect relative movement between the litter and the base between a plurality of vertical configurations, the lift mechanism including a frame assembly pivotably coupled to each of the base and the litter, the frame assembly comprising: an inner frame member defining an upper exterior surface and a lower exterior surface, an outer frame member defining an interior with an upper interior surface and a lower interior surface, a first support member coupled to the inner frame member and arranged for moving contact with the upper interior surface of the outer frame member, a second support member arranged for moving contact with the lower exterior surface of the inner frame member, a first support element arranged for moving contact with the lower interior surface of the outer frame member, and a second support element arranged for moving contact with the upper exterior surface of the inner frame member;

wherein the lift mechanism is selectively operable between:

a transport mode where the base is disposed in engagement with the floor surface and supports the litter for movement relative to the base with the frame assembly loaded to transfer load from the litter to the base via the moving contact of the first and second support elements, and a suspended mode where the base is spaced from the floor surface with the frame assembly loaded to transfer load from the base to the litter via the moving contact of the first and second support members.

2. The patient transport apparatus as set forth in claim 1, wherein a support member type of moving contact is defined by the moving contact of the first support member with the upper interior surface of the outer frame member and the moving contact of the second support member with the lower exterior surface of the inner frame member; and wherein a support element type of moving contact, different from the support member type of moving contact, is defined by the moving contact of the first support element with the lower interior surface of the outer frame member and the moving contact of the second support element with the upper exterior surface of the inner frame member.

3. The patient transport apparatus as set forth in claim 2, wherein the first and second support elements are further defined as first and second rollers; and wherein the first and second support members are further defined as first and second non-rolling members.

4. The patient transport apparatus as set forth in claim 1, wherein the lift mechanism is configured for selective movement between the plurality of vertical configurations in each of the transport mode and the suspended mode; and wherein the plurality of vertical configurations include a collapsed configuration and an extended configuration, with the litter being arranged further away from the base in the extended configuration than in the collapsed configuration.

5. The patient transport apparatus as set forth in claim 4, wherein the second support member is coupled to the outer frame member; and wherein movement from the extended configuration towards the collapsed configuration moves the first support member towards the second support member within the interior of the outer frame member.

6. The patient transport apparatus as set forth in claim 5, wherein the first support element is coupled to the inner frame member and the second support element is coupled to the outer frame member; and wherein movement from the collapsed configuration towards the extended configuration moves the first support element towards the second support element within the interior of the outer frame member.

7. The patient transport apparatus as set forth in claim 1, wherein the inner frame member is pivotably coupled to the base.

8. The patient transport apparatus as set forth in claim 7, wherein the outer frame member is arranged for pivoting movement relative to the litter.

9. The patient transport apparatus as set forth in claim 1, further comprising:

a guide body coupled to the litter and defining a channel; and a slide interface coupled to the outer frame member and disposed within the channel for pivoting movement within the channel and for sliding movement along the channel as the lift mechanism moves between the plurality of vertical configurations.

10. The patient transport apparatus as set forth in claim 1, wherein the inner frame member includes an inner chamber and defines an aperture; and wherein the first support element is disposed within the inner chamber and extends through the aperture into rolling contact with the lower interior surface of the outer frame member.

11. The patient transport apparatus as set forth in claim 1, wherein the outer frame member defines an opening; and wherein the second support element extends through the opening into rolling contact with the upper exterior surface of the inner frame member.

12. The patient transport apparatus as set forth in claim 11, further comprising a cover releasably attached to the outer frame member and extending over the second support element to create a tortious path for ingress of contaminants towards the inner frame member.

13. The patient transport apparatus as set forth in claim 12, wherein the outer frame member includes lateral walls arranged adjacent to the opening and extending towards the litter, the lateral walls supporting a support element shaft extending over the opening and rotatably supporting the second support element.

14. The patient transport apparatus as set forth in claim 13, wherein the cover extends over at least a portion of the lateral walls.

15. The patient transport apparatus as set forth in claim 1, wherein the second support element defines a pair of contact surfaces each arranged for engagement with the upper exterior surface of the inner frame member.

16. The patient transport apparatus as set forth in claim 15, wherein the upper exterior surface of the inner frame member has a generally curved profile.

17. The patient transport apparatus as set forth in claim 16, wherein each of the contact surfaces of the second support element has a generally frustoconical profile.

18. The patient transport apparatus as set forth in claim 15, wherein the second support element further defines a void arranged between the contact surfaces and shaped to collect contaminants therein.

19. The patient transport apparatus as set forth in claim 18, wherein the contact surfaces of the second support element are skewed relative to one another and converge towards an apex arranged adjacent to the void to direct contaminants towards the apex and into the void as the second support element moves in rolling contact along the upper exterior surface of the inner frame member; and wherein the contact surfaces are arranged in a generally V-shaped configuration.

20. A patient transport apparatus for supporting a patient, the patient transport apparatus comprising:

a litter comprising a patient support deck configured to support the patient;

a base configured to engage a floor surface; and a lift mechanism extending between the litter and the base to effect relative movement between the litter and the base between a plurality of vertical configurations, the lift mechanism including a frame assembly pivotably coupled to each of the base and the litter, the frame assembly comprising: an inner frame member defining an upper exterior surface and a lower exterior surface, an outer frame member defining an interior with an upper interior surface and a lower interior surface, a first roller arranged for rolling contact with the lower interior surface of the outer frame member, a second roller arranged for rolling contact with the upper exterior surface of the inner frame member, a first non-rolling member coupled to the inner frame member and arranged for moving contact with the upper interior surface of the outer frame member, and a second non-rolling member arranged for moving contact with the lower exterior surface of the inner frame member; and wherein the lift mechanism is selectively operable between:

a transport mode where the base is disposed in engagement with the floor surface and supports the litter for movement relative to the base with the frame assembly loaded to transfer load from the litter to the base via the rolling contact of the first and second rollers, and a suspended mode where the base is spaced from the floor surface with the frame assembly loaded to transfer load from the base to the litter via the moving contact of the first and second non-rolling members.

* * * * *